US008109810B2

(12) United States Patent
Blenkinsopp et al.

(10) Patent No.: US 8,109,810 B2
(45) Date of Patent: Feb. 7, 2012

(54) SHELLFISH POSITIONING AND OPENING APPARATUS

(75) Inventors: Keith Blenkinsopp, Auckland (NZ);
Niven Rhys Brown, Auckland (NZ);
Nicholas Leon Hildreth, Auckland (NZ); Christopher Anaru Lennox, Auckland (NZ); Andrew Charles Osborn, Auckland (NZ); Winston Duang Wickham, Auckland (NZ)

(73) Assignee: Sanford Limited (NZ)

( * ) Notice: Subject to any disclaimer, the term of this patent is extended or adjusted under 35 U.S.C. 154(b) by 279 days.

(21) Appl. No.: 12/523,355

(22) PCT Filed: Jan. 15, 2008

(86) PCT No.: PCT/NZ2008/000002
§ 371 (c)(1),
(2), (4) Date: Jul. 16, 2009

(87) PCT Pub. No.: WO2008/088229
PCT Pub. Date: Jul. 24, 2008

(65) Prior Publication Data
US 2010/0048113 A1    Feb. 25, 2010

(30) Foreign Application Priority Data
Jan. 16, 2007   (NZ) ....................... 552626

(51) Int. Cl.
*A22C 29/04*    (2006.01)
(52) U.S. Cl. ....................................................... 452/16
(58) Field of Classification Search ............... 452/12, 452/13, 16, 18, 19
See application file for complete search history.

(56) References Cited

U.S. PATENT DOCUMENTS

| 4,222,153 A | * | 9/1980 | Schmidt | 452/5 |
| 4,236,277 A | * | 12/1980 | Rudy et al. | 452/9 |
| 4,439,893 A | * | 4/1984 | Betts | 452/3 |
| 4,715,093 A | * | 12/1987 | Lapeyre et al. | 452/10 |

(Continued)

FOREIGN PATENT DOCUMENTS
JP    8-289718 A    11/1996

(Continued)

OTHER PUBLICATIONS
International Search Report for PCT/NZ2008/000002.

*Primary Examiner* — Richard Price, Jr.
(74) *Attorney, Agent, or Firm* — Brooks Kushman P.C.

(57) ABSTRACT

A shellfish positioning and opening apparatus having at least one processing lane whereby the apparatus includes the following stations of an in-feed and singulation station followed by a reorientation assembly station utilizing a vision system and a holding and opening assembly station. The said processing stations are operatively connected in that order together to receive shellfish having meat therein to position said shellfish according to their shape and orientation to enable shellfish to be halved so that one shellfish half has the shellfish meat thereon. A method is also included having the steps of—singulating the shellfish; applying vision system to determine and compare orientation of shellfish, reorienting each shellfish so that the shellfish is pointing in the right direction, abutting said shellfish to the vertical alignment device to cause said shellfish to be substantially vertical and loading shellfish onto lifting assembly to lift said shellfish to allow the holding and opening assembly to hold it against the hinge breaker, apply a vacuum to create a gape whereby the knife assembly slidably operates to cut the meat from one shellfish half.

11 Claims, 32 Drawing Sheets

U.S. PATENT DOCUMENTS

| | | | |
|---|---|---|---|
| 4,718,145 A * | 1/1988 | Silchenstedt | 452/19 |
| 6,110,032 A | 8/2000 | Earnshaw | |
| 6,508,699 B1 * | 1/2003 | Santoriello et al. | 452/99 |
| 7,867,067 B2 * | 1/2011 | Dancy et al. | 452/5 |

FOREIGN PATENT DOCUMENTS

| | | |
|---|---|---|
| JP | 11-285345 A | 10/1999 |
| WO | 98/42197 A1 | 10/1998 |
| WO | 99/31992 A1 | 7/1999 |

* cited by examiner

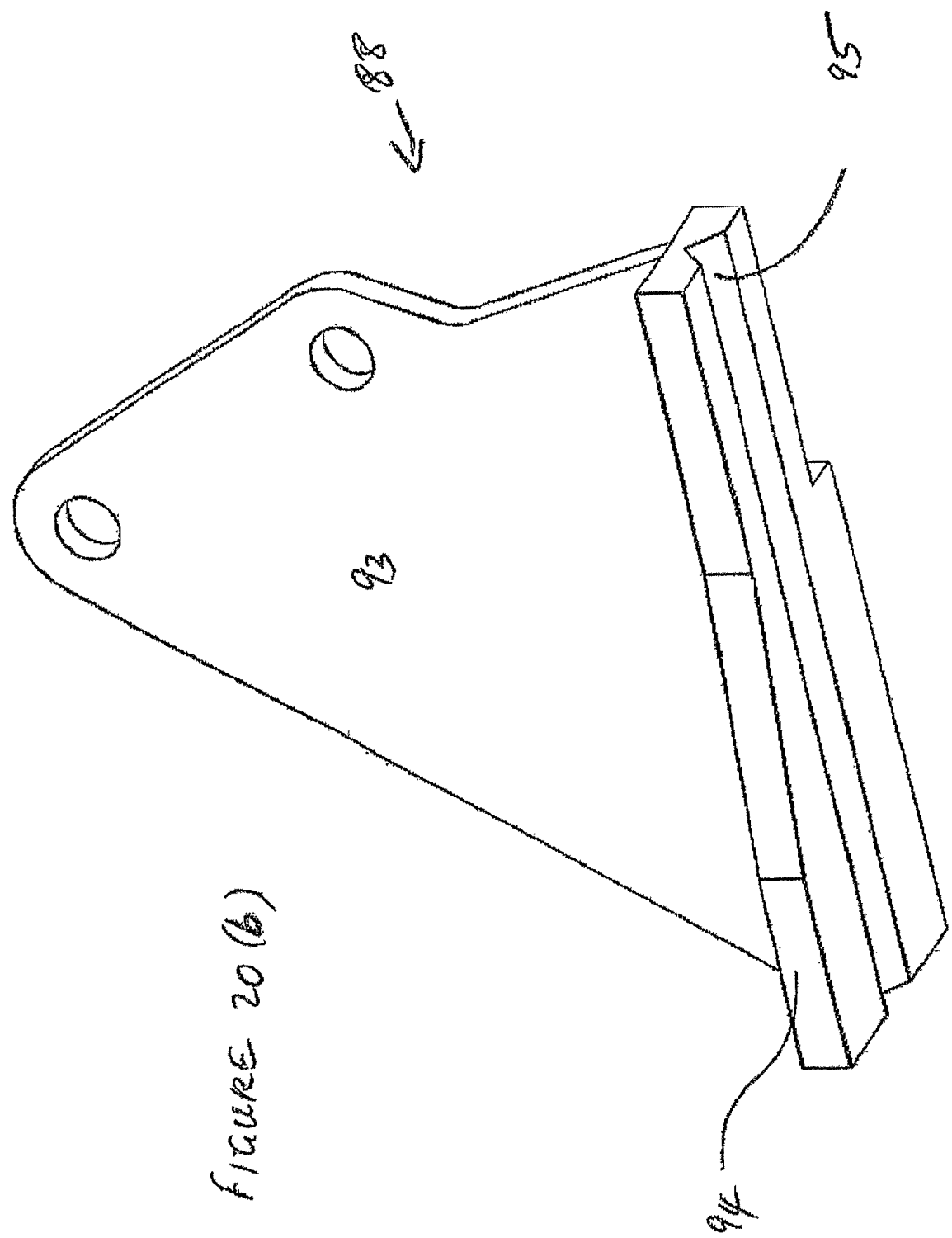

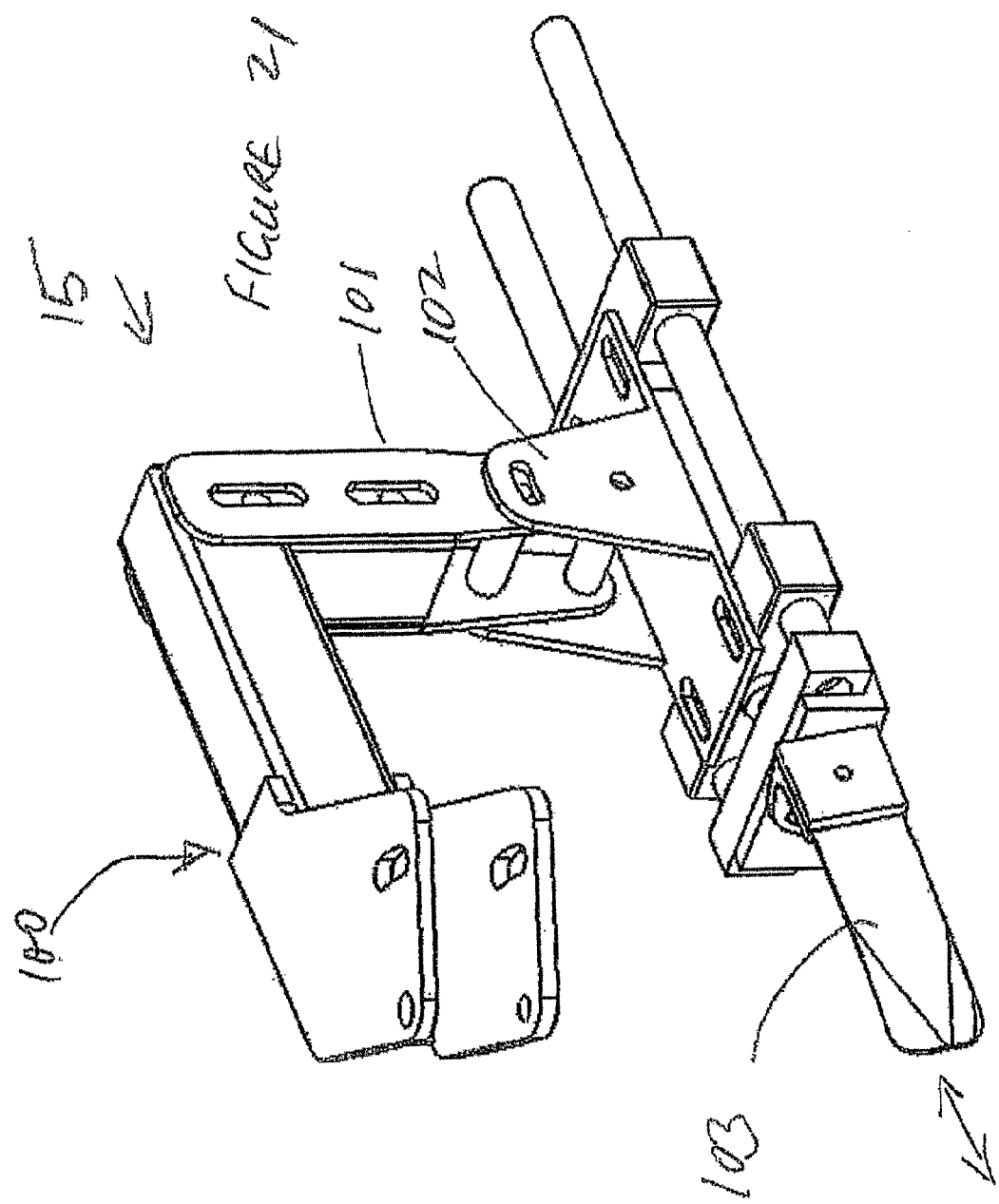

SHELLFISH POSITIONING AND OPENING APPARATUS

The invention relates to a shellfish positioning and opening apparatus. The invention is directed particularly but not solely towards an apparatus and method for use with shellfish or bivalve shellfish.

BACKGROUND OF INVENTION

Processing shellfish like for example any bivalve such as mussels or oysters or scallops can be very labour intensive. Initially one has to position each shellfish to enable the inserting of a cutting implement to separate into two halves. This type of work is extremely repetitive and dependent on the different skill levels of each person carrying out this work. Therefore output can be erratic and hard to predict.

Other issues involved are health and safety whereby large rooms or work areas with large tables are required. It is necessary to be mindful of repetitive injuries thereby requiring a constant rotation of personnel. It is also necessary to sharpen all tools and provide protective clothing for personnel and make sure that these work areas are regularly cleaned to minimise shellfish contamination.

Some mechanical apparatus used to carry out such work can also suffer from being expensive to build and maintain and be so large as to require special housing. Some machines can be too complicated and be sensitive to simple breakdowns. Reliability is another problem for any complicated machinery making problem-detecting very difficult. Some machines can be difficult to clean which can further cause problems in excessive machine downtime.

The discussion herein of the background to the invention is included to explain the context of the invention. This is not to be taken as an admission that any of the material referred to was published, known or part of the common general knowledge as of the priority date of any of the claims.

OBJECT OF INVENTION

It is an object of the invention to provide shellfish positioning and opening apparatus and method that ameliorates some of the disadvantages and limitations of the known art or at least provide the public with a useful choice.

SUMMARY OF INVENTION

In a first aspect the invention resides in a shellfish positioning and opening apparatus having at least one processing lane whereby the apparatus including the following stations of an in-feed and singulation station followed by a reorientation assembly station utilizing a vision system and a holding and opening assembly station whereby said stations are operatively connected in that order together to receive shellfish having meat therein to position said shellfish according to their shape and orientation to enable shellfish to be halved so that one shellfish half has the shellfish meat thereon.

Preferably the in-feed and singulation station includes a hopper operatively connected to a scroll feeding mechanism and then to a trough which feeds the shellfish to a pair of parallel rollers to rotatably form a single row of semi upright or on-edge oriented shellfish.

Preferably apparatus includes a conveyor which operatively takes each shellfish from station to station.

Preferably the reorientation assembly is adapted to reorient the position of a singulated shellfish by movement in four different axes of direction whereby each shellfish is clamped, vertically lifted and held and then rotated about the vertical and/or horizontal axis wherein the reorientation assembly includes a support means and a vertically slidably clamping assembly which such clamping can also be rotated horizontally to reorient each shellfish such that keel and point are properly oriented.

Preferably a vertical alignment device is located procedurally after the reorientation assembly so the device is lowered to be in front of the shellfish to ensure that the shellfish are aligned in the vertical plane.

Preferably a primary ejector being located between the vision system and the reorientation assembly can eject any shellfish from the conveyor which do not meet any predetermined criteria wherein the ejector comprises pneumatically operated piston controlled by a controller.

Preferably a secondary ejector being located between the reorientation assembly and the vertical alignment device also ejects any shellfish wrongly positioned to allow any vertical alignment by the vertical alignment device wherein the ejector comprises pneumatically operated piston controlled by a controller.

Preferably various sensors are operatively located with respect to all station components such as scroll feeder sensor, two singulation sensors presence sensor in before vertical alignment assembly and in lifting assembly (loader), single vacuum sensor, and reed switches on cylinders. These are on some of the pneumatic actuators and generally detect when the cylinder is fully extended or fully retracted or is at or going past some intermediary position. N.B. Reed switches can be seen on the cylinders in most of the figures)

Preferably a lifting or loader assembly which is located after the re-orientation assembly includes a cradle slidably supported by a support which in use locates the shellfish in a general vertical plane which is vertically raised to allow the holding & opening assembly to operate.

Preferably the holding and opening assembly operatively includes a support means, slidable vacuum cup assembly and hinge breaker which is adapted to grab a shellfish from the lifting assembly to at least partially open it whereby a knife assembly slidably operates to cut the meat from one shellfish half and then to break the shellfish hinge.

In a second aspect the invention resides in a method of shellfish positioning and opening wherein a shellfish positioning and opening apparatus is provided having at least one processing lane whereby the apparatus including the following stations of an in-feed and singulation station followed by a reorientation assembly station utilizing a vision system and a holding and opening assembly station whereby said stations are operatively connected in that order together to receive shellfish having meat therein to position said shellfish according to their shape and orientation to enable shellfish to be halved so that one shellfish half has the shellfish meat thereon, the in-feed and singulation station includes a hopper operatively connected to a scroll feeding mechanism and then to a trough which feeds the shellfish to a pair of parallel rollers to rotatably form a single row of semi upright or on-edge oriented shellfish, a vertical alignment device is located procedurally after the reorientation assembly so the device is lowered to be in front of the shellfish to ensure they are aligned in the vertical plane, the holding and opening assembly operatively includes a support means, slidable vacuum cup assembly and hinge breaker which is adapted to grab a shellfish from the loader to hold it against the hinge breaker, apply a vacuum to create a gape whereby a knife assembly slidably operates to cut the meat from one shellfish half and then the cups move apart to break the hinge, the method includes the following steps of processing at least one shellfish as located on a conveyor between said stations:

singulating the shellfish by adjusting the feeding therein leading to the rotating rollers;

applying vision system to determine and compare orientation of shellfish;

reorienting each shellfish so that the shellfish is pointing in the right direction;

abutting said shellfish to the vertical alignment device to cause said shellfish to be substantially vertical and;

loading shellfish onto the lifting assembly to lift said shellfish to allow the holding and opening assembly to hold the shellfish against the hinge breaker, apply a vacuum to create a gape whereby the knifing assembly slidably operates to cut the shellfish meat from one shellfish half and then the cups move apart to break the hinge.

Preferably a primary ejector located between the vision system and the reorientation assembly ejects any shellfish from the conveyor which do not meet any predetermined position wherein the ejector comprises pneumatically operated piston controlled by a controller.

Preferably a secondary ejector located between the reorientation assembly and the vertical alignment device also ejects any shellfish wrongly positioned to allow any vertical alignment by the vertical alignment device wherein the ejector comprises pneumatically operated piston controlled by a controller.

Preferably the in-feed and singulation station includes an in-feed chute, hopper, lifting conveyor and in-feed tray and vibration means whereby the hopper receives mussels which then is lifted by the lifting conveyor to the in-feed tray which is vibrated by a vibrating system such that the mussels are singulated.

Preferably the in-feed tray has a first tray followed by a second tray and deflector whereby the second tray is a step below the first tray.

Preferably the apparatus includes a chain conveyor to move singulated mussels from the in-feed and singulation station to the orientation station.

Preferably the orientation station is located adjacent to the chain conveyor and includes a vision system and reorientation assembly whereby the vision system includes a camera acting as a line scan system to measure the mussel profile and two algorithms are then used to determine the orientation of a mussel which can trigger the orientation assembly using 2 axes to make sure the mussel is on its long edge or to reject using an ejection system.

Preferably an ejection system is located adjacent to the orientation assembly to reject any mussels not meeting the pre-programmed mussel shape to enable recycling.

Preferably a vertical alignment device is located past the orientation device operatively adjacent to the conveyor with which to correctly align the mussel in the vertical plane.

Preferably an opening station which is located operatively adjacent to the chain conveyor, includes stopping and lifting assembly, holding and opening assembly and knife assembly to first lift a mussel so the holding and opening assembly can firstly hold a mussel to gape it open whereby the knifing assembly severs the adductor muscle and then the mussel hinge is then broken by rotating a portion of the holding and opening assembly.

Preferably, the holding assembly includes an opening head having vacuum cups to grip the mussel and mussel hinge breaker.

BRIEF DESCRIPTION

The invention will now be described, by way of example only, by reference to the accompanying drawings:

FIG. 1 is a perspective view of the shellfish positioning and opening apparatus with all covers in place.

FIG. 2 is a perspective view of the shellfish positioning and opening apparatus without any covers in place and two exit chutes.

FIG. 3 is a perspective view of the shellfish positioning and opening apparatus without any covers in place and one exit chute.

FIG. 4 is a schematic view of a shellfish such as a mussel.

FIG. 5 is a front view of the apparatus with entry end at the top right.

FIG. 6 is a similar view to FIG. 5 but with an exit chute removed.

FIG. 7 is a rear view of the apparatus.

FIG. 8 is a similar rear view to FIG. 7 but with an exit chute removed.

FIG. 9 is a close up perspective view of the in-feed and singulation part of the apparatus.

FIG. 10 is an upper perspective view of the vertical aligner assembly.

FIG. 11 is a close up perspective view of the middle portion of the apparatus.

FIG. 12 is a close up perspective view of the middle to end portion of the apparatus.

FIG. 13 is a perspective view of the reorientation assembly.

FIG. 14 is a perspective view of the ejection system assembly.

FIG. 15 is a close up perspective view of the cutting portion of the assembly.

FIG. 16 is a similar view to FIG. 13 but with the suction cups rotated in position to hold a mussel.

FIG. 17 is a side view of the knife assembly and holding assembly.

FIG. 18 is another side view of the knife assembly and suction holder with the knife extended.

FIG. 19 is a perspective view of the lifter assembly.

FIG. 20(*a*) is a perspective views (a) to (b) of the holding and opening assembly.

FIG. 20(*b*) is a perspective view of the hinge breaker of the holding and opening assembly.

FIG. 21 is a perspective view of the knife assembly.

FIG. 22 is a perspective view of a second embodiment of the apparatus.

FIG. 23 is a perspective view similar to FIG. 22 but without the side doors.

FIG. 24 is a side view of the apparatus of FIG. 23.

FIG. 25 is a perspective view of a portion of the in-feed area.

FIG. 26 is a perspective view of processing portion of the apparatus.

FIG. 27 is a perspective view of the reorientation device assembly.

FIG. 28 is a perspective close up view of the processing end of the apparatus.

FIG. 29 is a perspective view of the loader assembly.

FIG. 30 is a perspective view of the vacuum cup assembly.

FIG. 31 is a perspective view of the knife assembly.

FIG. 32 is an upper perspective view of the out-feed chutes.

DESCRIPTION OF DRAWINGS

The following description will describe the invention in relation to preferred embodiments of the invention, namely a positioning and opening apparatus. The invention is in no way limited to these preferred embodiments as they are purely to exemplify the invention only and that possible variations and modifications would be readily apparent without departing from the scope of the invention.

FIGS. 1-21 show a shellfish positioning and opening apparatus 1 in general terms there are the following components or assemblies operatively connected in a frame or housing 2 with various guards or covers together in an almost consequential sequence as follows:

Figure 1:
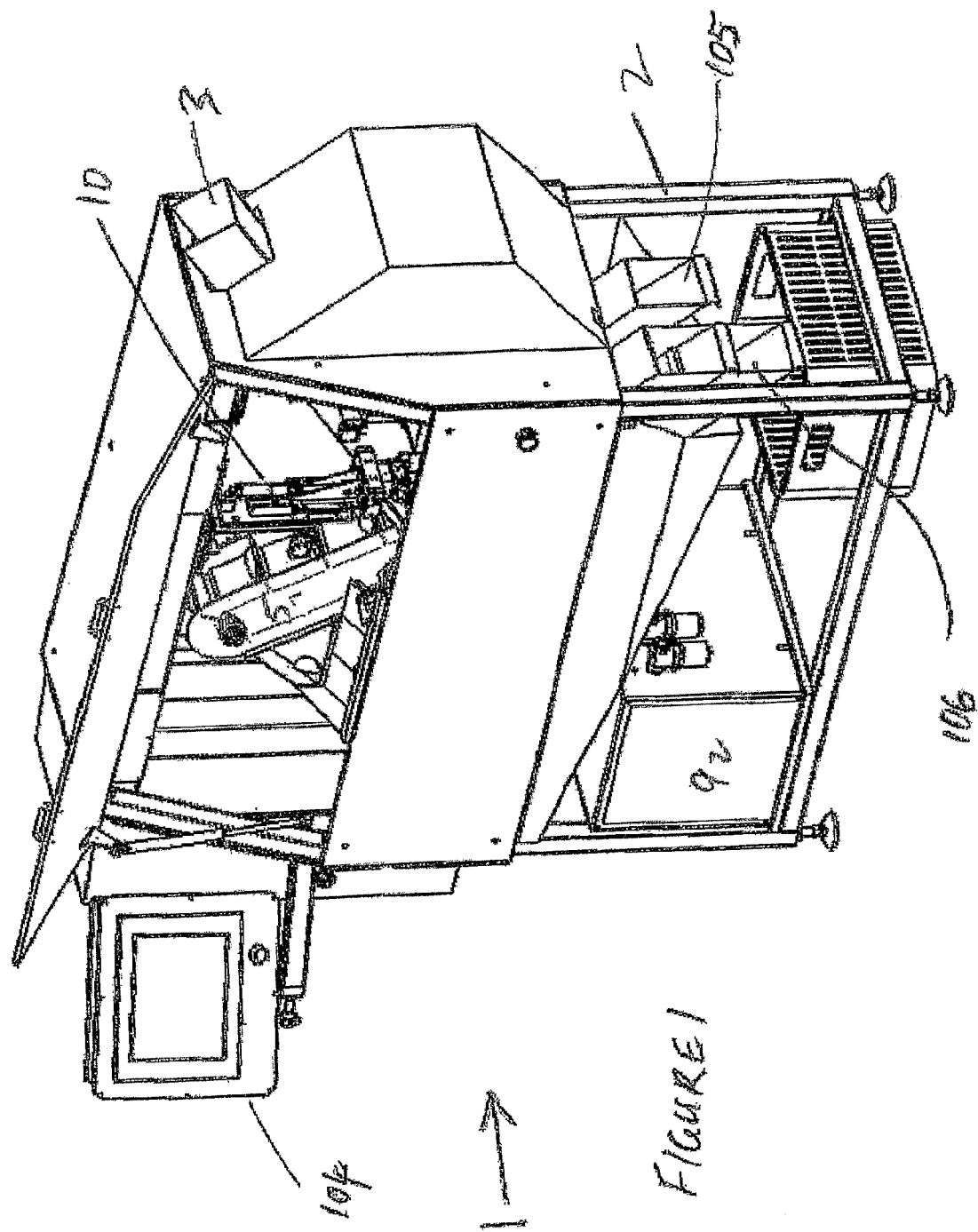

In-feed chute 3
Hopper 4
Lifting conveyor 5
In-feed tray 6 and vibration means 7
Chain conveyor 8
Vision system 9
Reorientation assembly 10
Ejection system 11
Vertical alignment device 12
Lifting assembly 13
Holding and opening assembly 14
Knife assembly 15

In summary the shellfish positioning and opening apparatus is designed to take one mussel or several mussels and singulate and orient them in a generally vertical orientation for opening and then cutting or scrapping the adductor muscle to produce two separate shell halves with one half having the shellfish meat thereon and the other being a waste shell. Various components such as the covers or guards, viewing windows and means for activating various apparatus, assemblies, components, parts or devices are included can be said to be known and so are not explained or shown in detail.

Some examples of activating means are the pneumatics or electric operating systems or motors etc. The supporting frame 2 and covers can be varied to suit structural or access requirements for maintenance or cleaning.

In general a mussel can be said to almost disc shaped having an edge border or mussel edge/join such that the edges define a first plane or vertical in use axis whereby in use during processing using the apparatus of the present invention, the mussel first plane is generally oriented substantially in the vertical direction or where the mussel is oriented on its edges or where from the defined points on a mussel the orientation can be determined and then used re-orientate if necessary (e.g. if in the horizontal plane or pointing in the wrong direction) to enable processing with a leading edge or any selection mussel position to be oriented with respect to any apparatus component, to halve the mussel.

Figure 4:
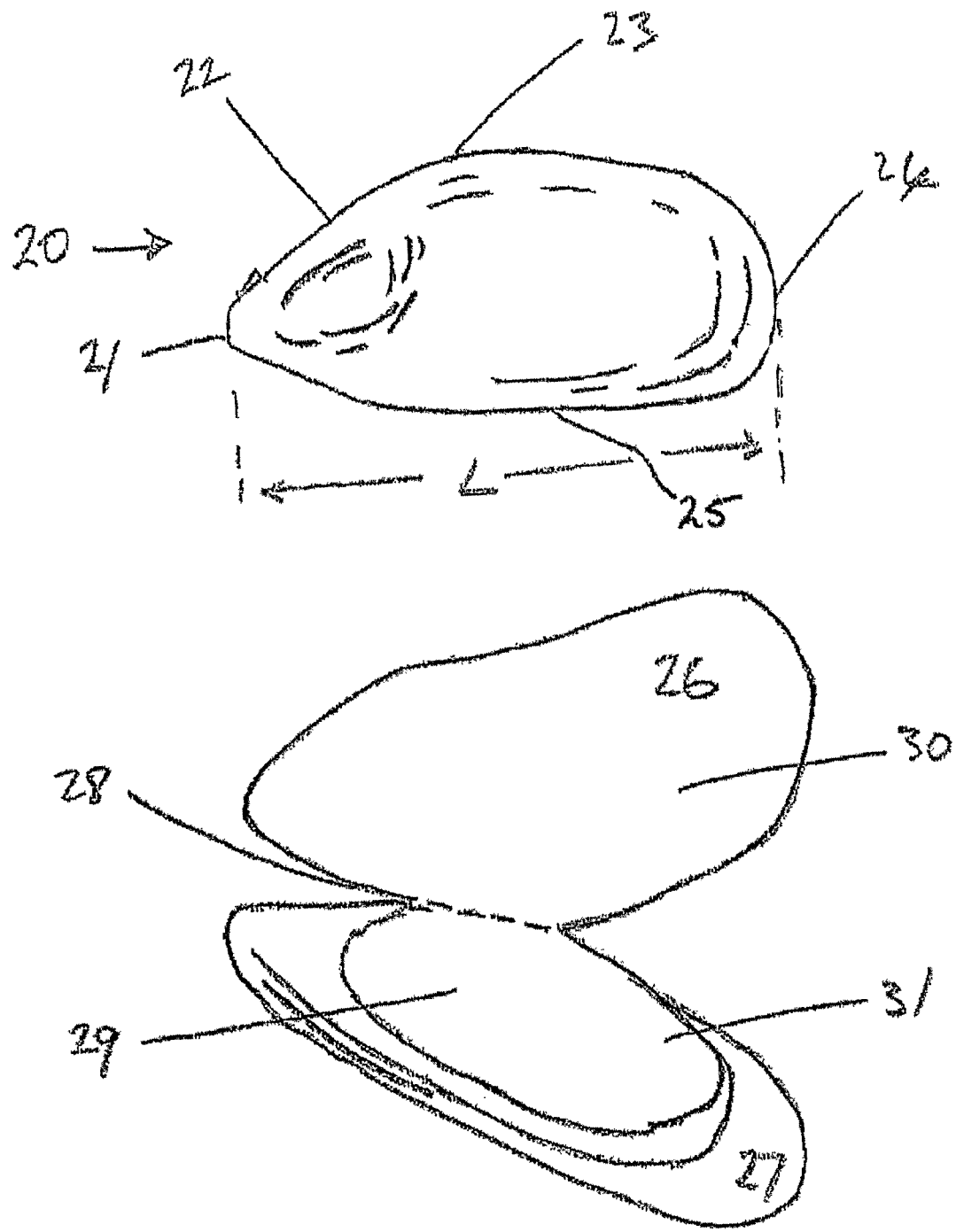
Figure 5:
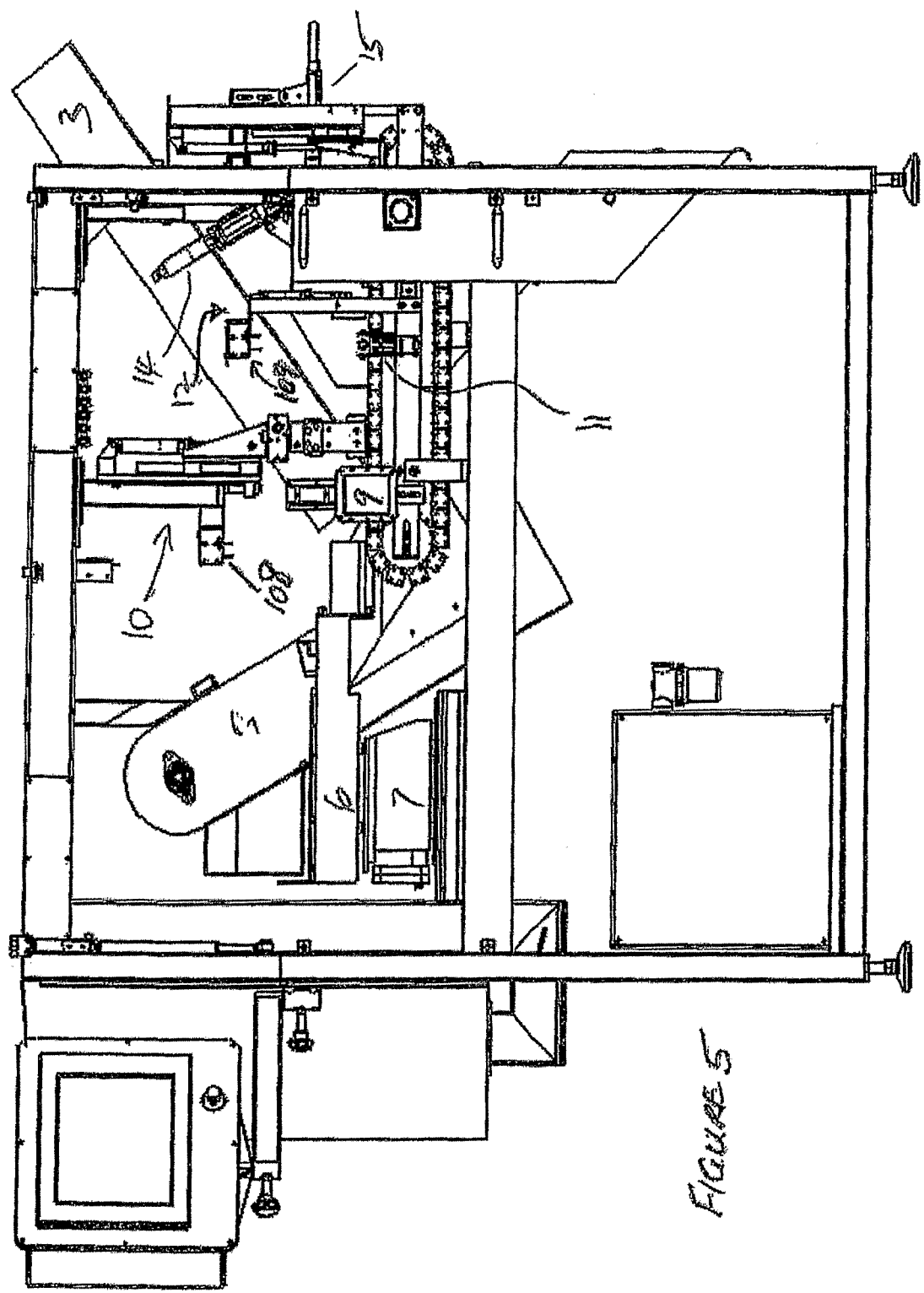
Figure 6:
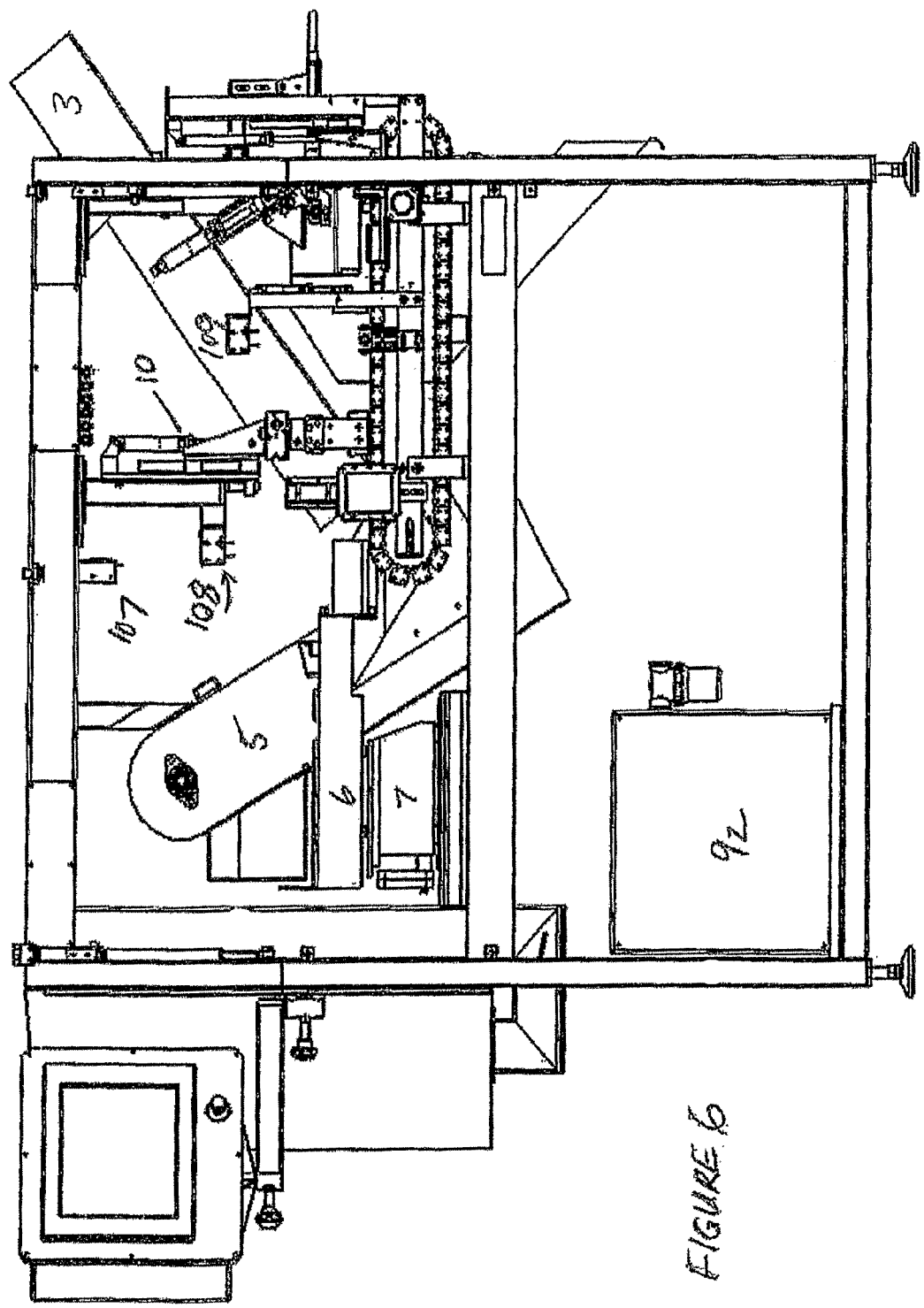
Figure 7:
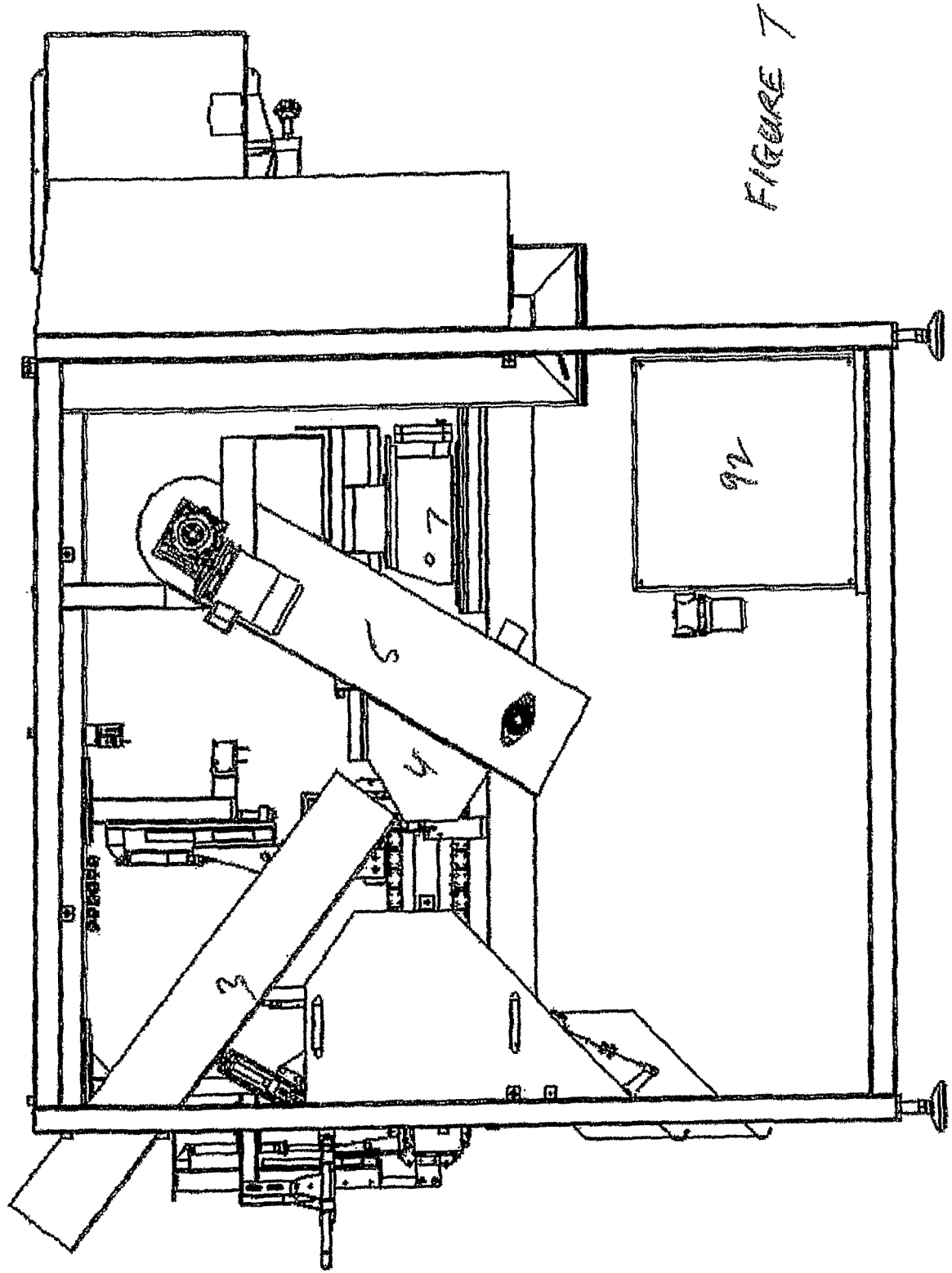
Figure 8:
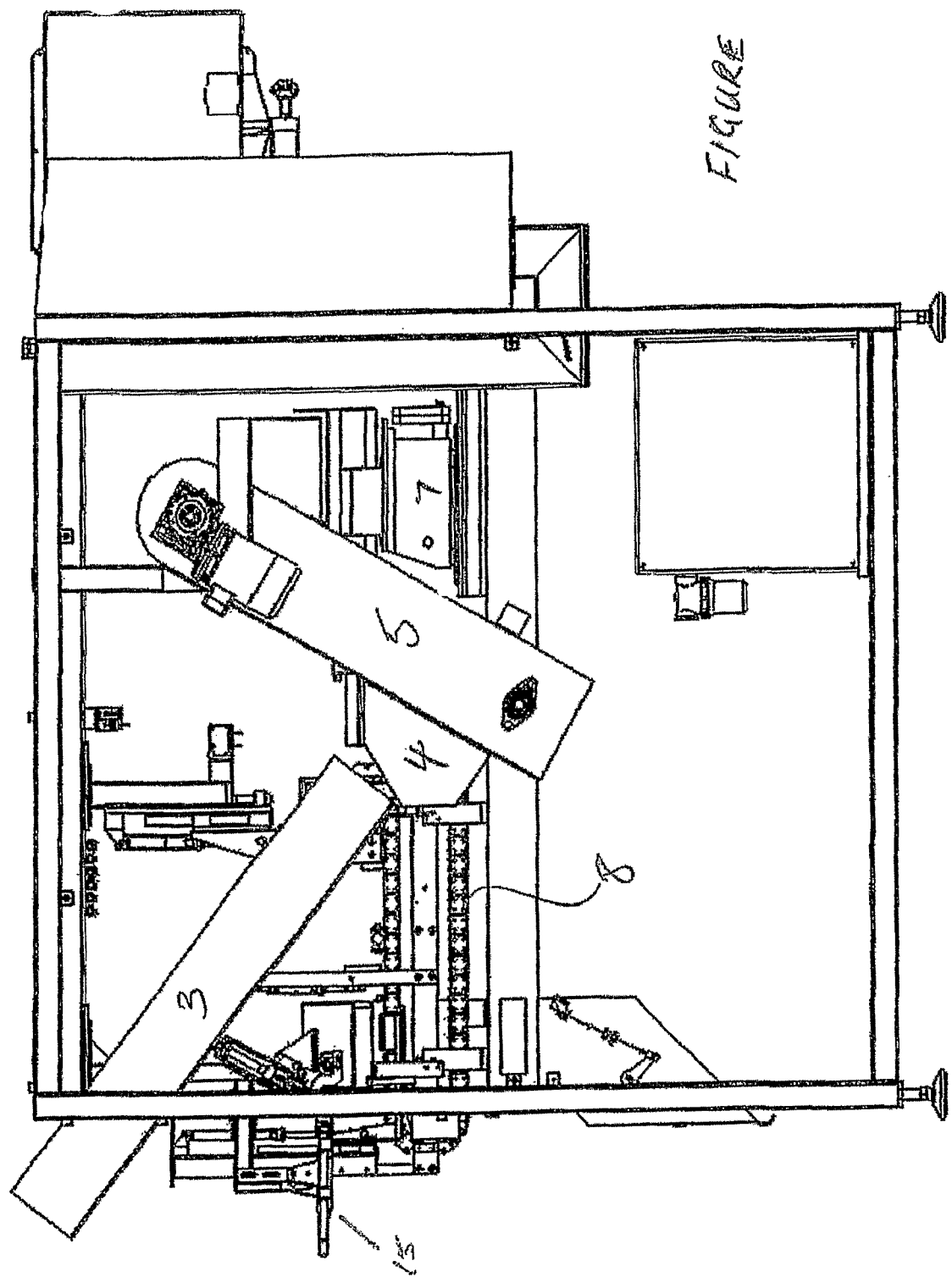

Each mussel 20 as shown in FIG. 4 has the following parts point 21, hinge 22, keel 23, leading edge 24 and long edge 25. FIG. 4(*b*) shows the mussel after opening and before separation into halves 26 and 27 with broken hinge 28, product or shellfish meat 29, location of adductor muscle 30 on waste shell 26 and adductor muscle 31. The mussel length L can be defined as being from the leading edge 24 to the point 21.

The mussel machine consists of the following process steps whereby a mussel is tracked through the components or assemblies or devices of the apparatus:

Bulk mussels are fed into the in-feed chute 3 and down into a hopper 4.
A lifting conveyor 5 takes the mussels from the hopper 4 and drops them into the in-feed tray 6.
The in-feed tray 6 is mounted on a vibratory feeder 7. This arranges the mussels roughly into single file and turns them onto either their long edge 25 or the keel edge 23.
The mussels then transfer onto a chain conveyor 8. This ensures the mussels are fully singulated.
On the chain conveyor 8 the mussels then pass a vision system 9 comprising a camera and lighting system that is used to determine the mussel's orientation and to trigger the reorientation device 10 to reorient the mussel into the required orientation for the opening system.
The reorientation device 10 comes down to the conveyor 8 to then pick a mussel off the chain conveyor 8, reorients with the keel up and with the point facing backwards and places it back onto the chain conveyor 8.
The conveyor 8 moves the mussel to the vertical alignment station having a vertical alignment device 12 which ensures the mussel is correctly aligned in the vertical plane i.e. in an upright position and said device is then vertically retracted to allow the mussel to move on after alignment.
An ejection system 11 is also located at the vertical alignment station to eject any mussels whose orientation could not be determined or that were lying on their side.
The mussel then is moved to a lifting assembly 13 station whereby a mussel is stopped and then upwardly lifted from the conveyor 8 to enable the holding means, and opening assembly to take over.
The holding and opening assembly 14 uses vacuum cups to grip and gape the mussel 20.
The knife assembly 15 which includes a knife is then extended into the gaped mussel to separate the adductor from one of the shells (the waste shell).
The vacuum cups of the holding assembly 14 then retract about a fixed support that is shaped to ensure the hinge is broken.
Once fully retracted, the vacuum is checked to ensure correct opening has been achieved and then the two shells, waste and product, are released down separate out-feed chutes.
The waste out-feed chute also has a diversion flap to ensure any product that is not waste goes out the product stream.

In-Feed and Singulation Process—See FIGS. 1-3 and 5-9

Figure 9:
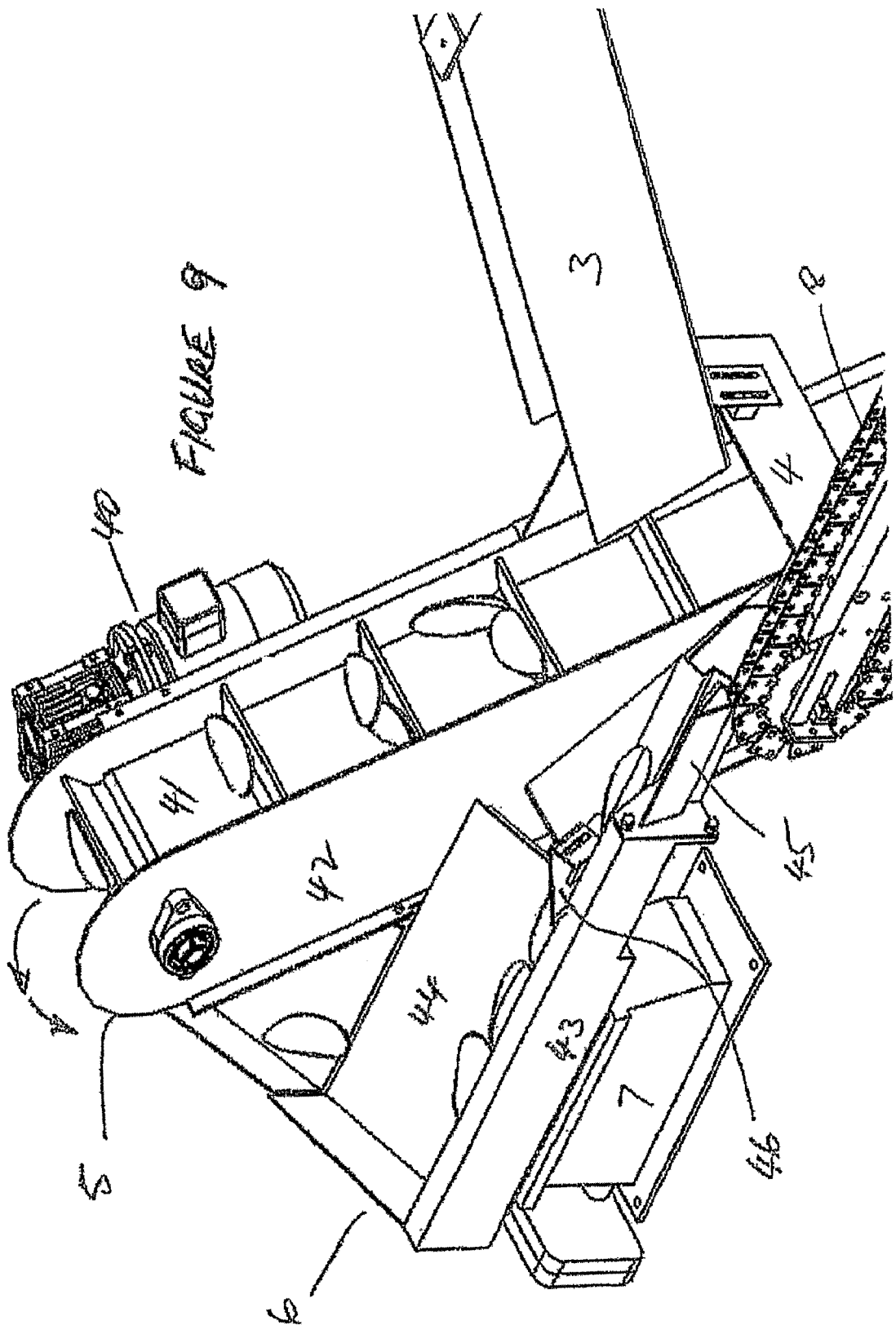

As shown in FIG. 9 the process includes feeding as many mussels as necessary or as the apparatus can handle. The in-feed chute 3 is oriented to enable the mussels to drop by gravity into the hopper 4 and onto the lifting conveyor 5 which is also angled with respect to the vertical to enable so many mussels to be separated somewhat and then dropped into the in-feed tray. In-feed tray 6 is horizontally supported with respect to the chute and lifting conveyor 5. These components are supported by the apparatus frame 2.

Lifting conveyor 5 includes a motor driven means 40 and stepped platform 41 partially enclosed by side members 42. In-feed tray 6 includes a horizontal support 43 and angled L-shaped tray 44 which in use causes the mussels to be gathered in the corner of tray 44 as shown in FIG. 9.

Angled tray or first tray 44 is joined to another tray or second tray 45 in a similar orientation but at a lower level to thereby further singulate the mussels and go some way to causing them to lie in a certain position. In-feed tray 6 also has an angled deflecting member 46 to assist in singulation.

Operatively connected to in-feed tray 6 is a vibrator 7 which is fixedly attached to the apparatus frame and activating means to vibrate in-feed tray and its contents. The chute and lifting conveyor assist in the smoothing out of the number of mussels entering the machine to enable the later stations to be able to cope with a maximum number of mussels entering the machine to be processed.

After being processed by the in-feed tray 6 each mussel is dropped onto a moving conveyor 8 which then forms a central important part of the apparatus as a whole thereby enabling a mussel to move past various assemblies or devices to be processed.

Figure 11:
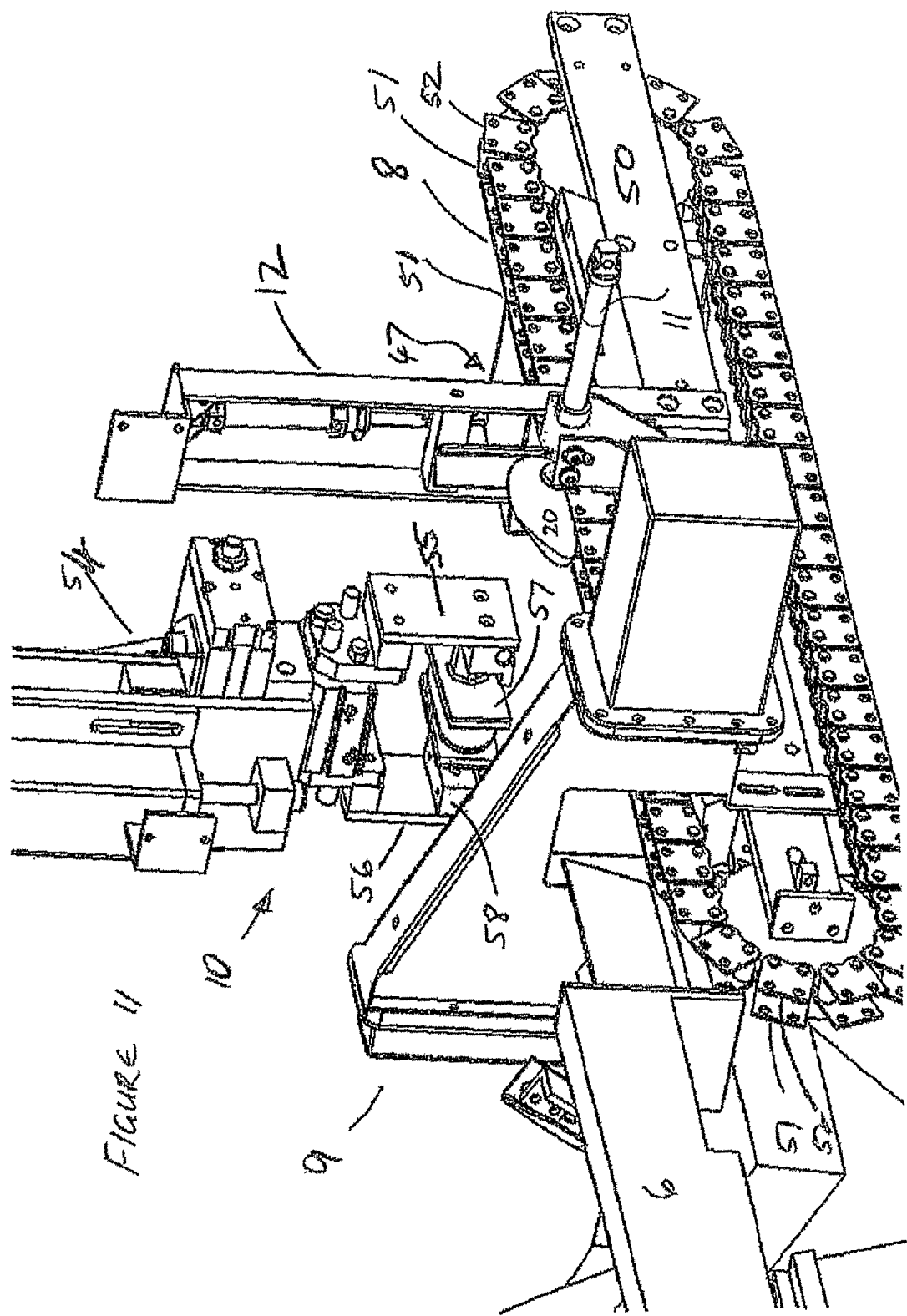
Figure 15:
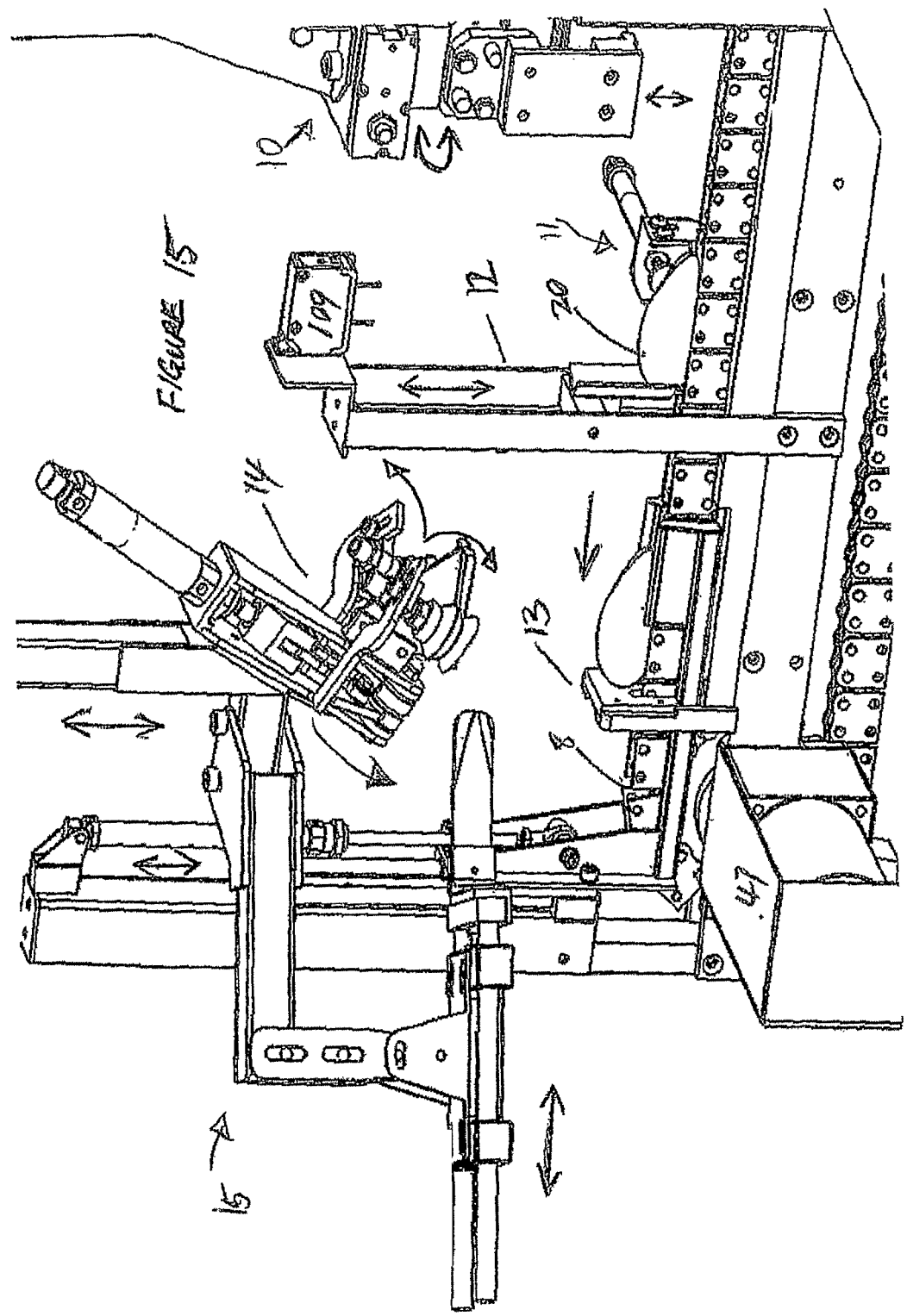
Figure 16:
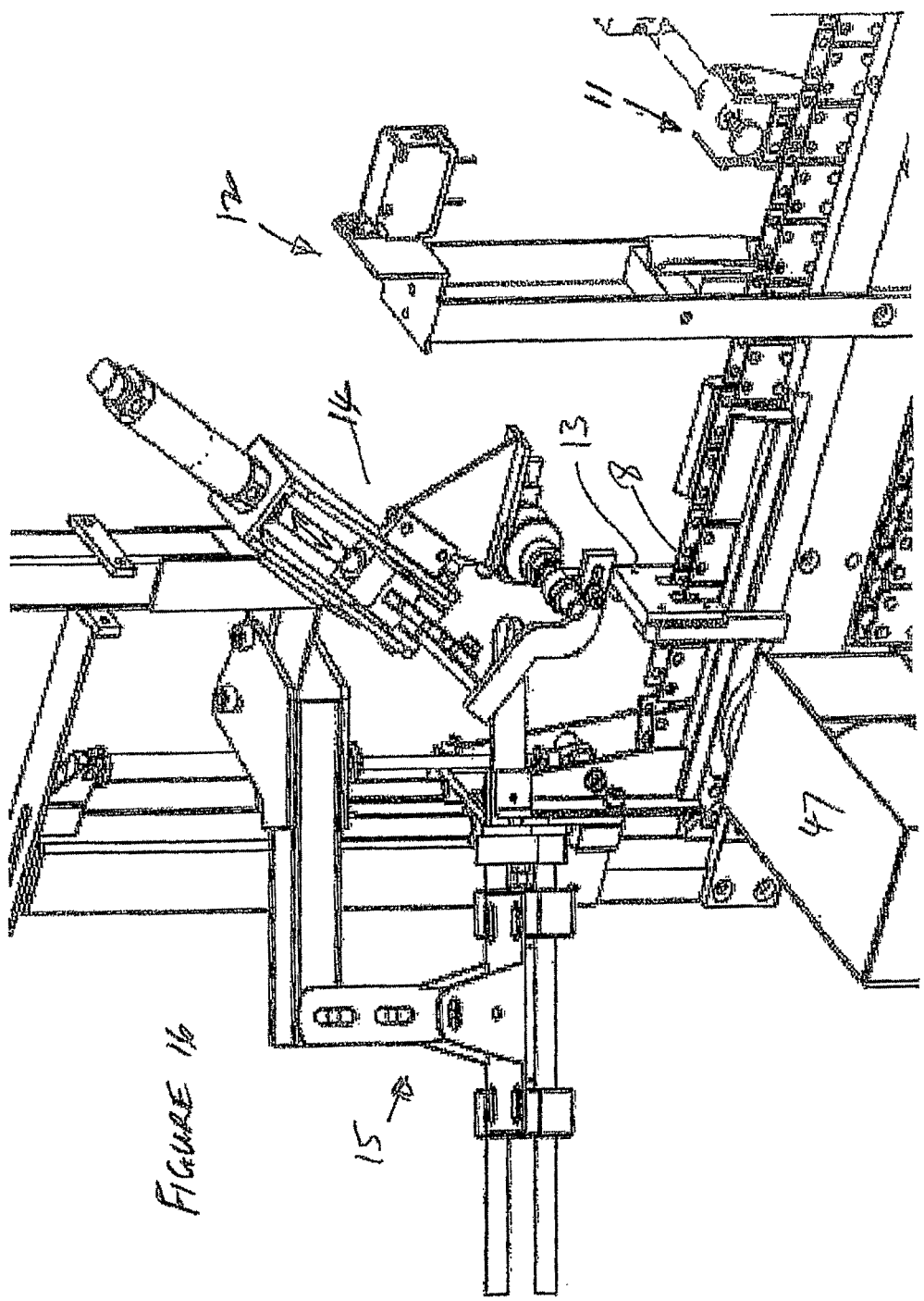
Figure 17:
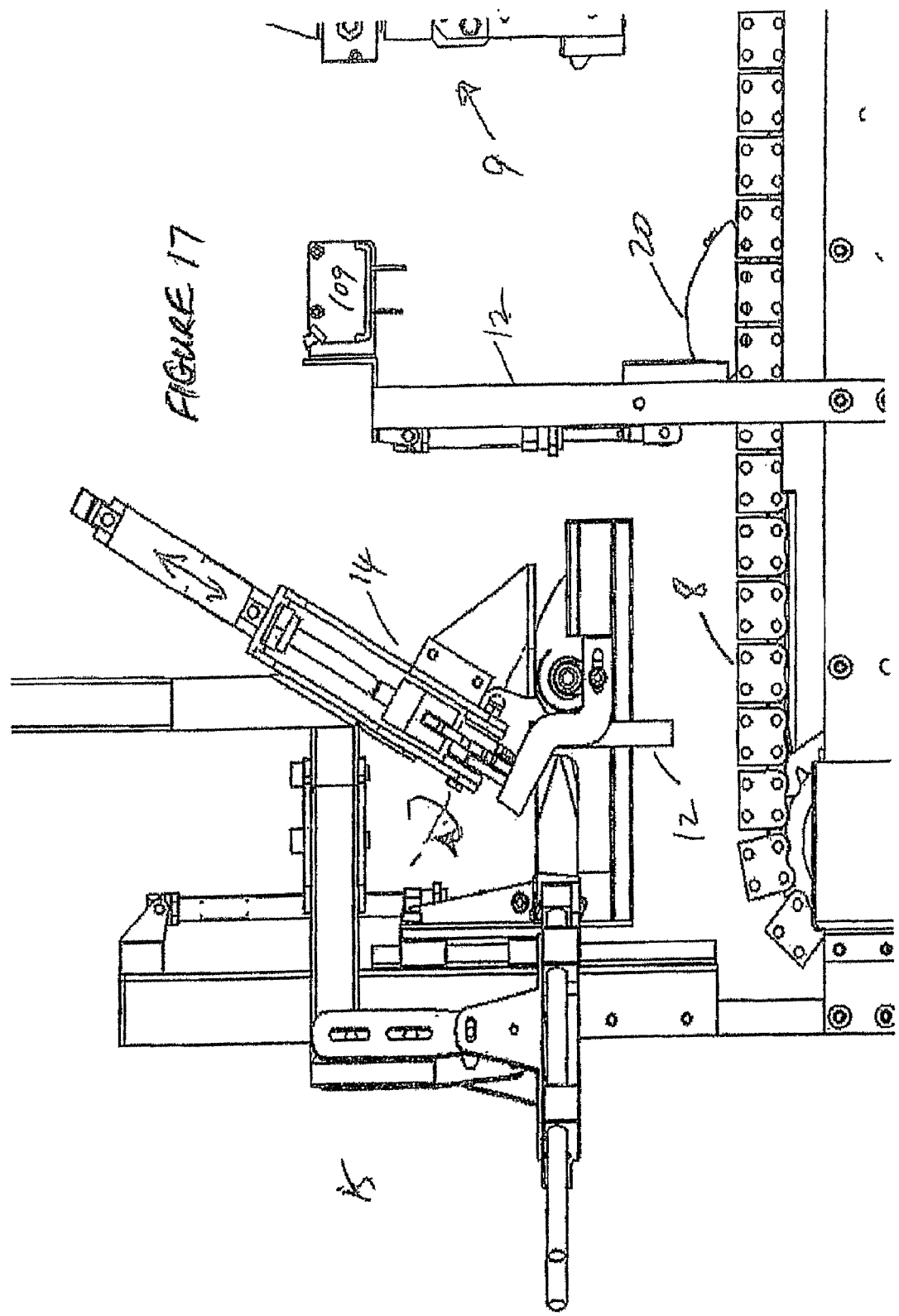
Figure 18:
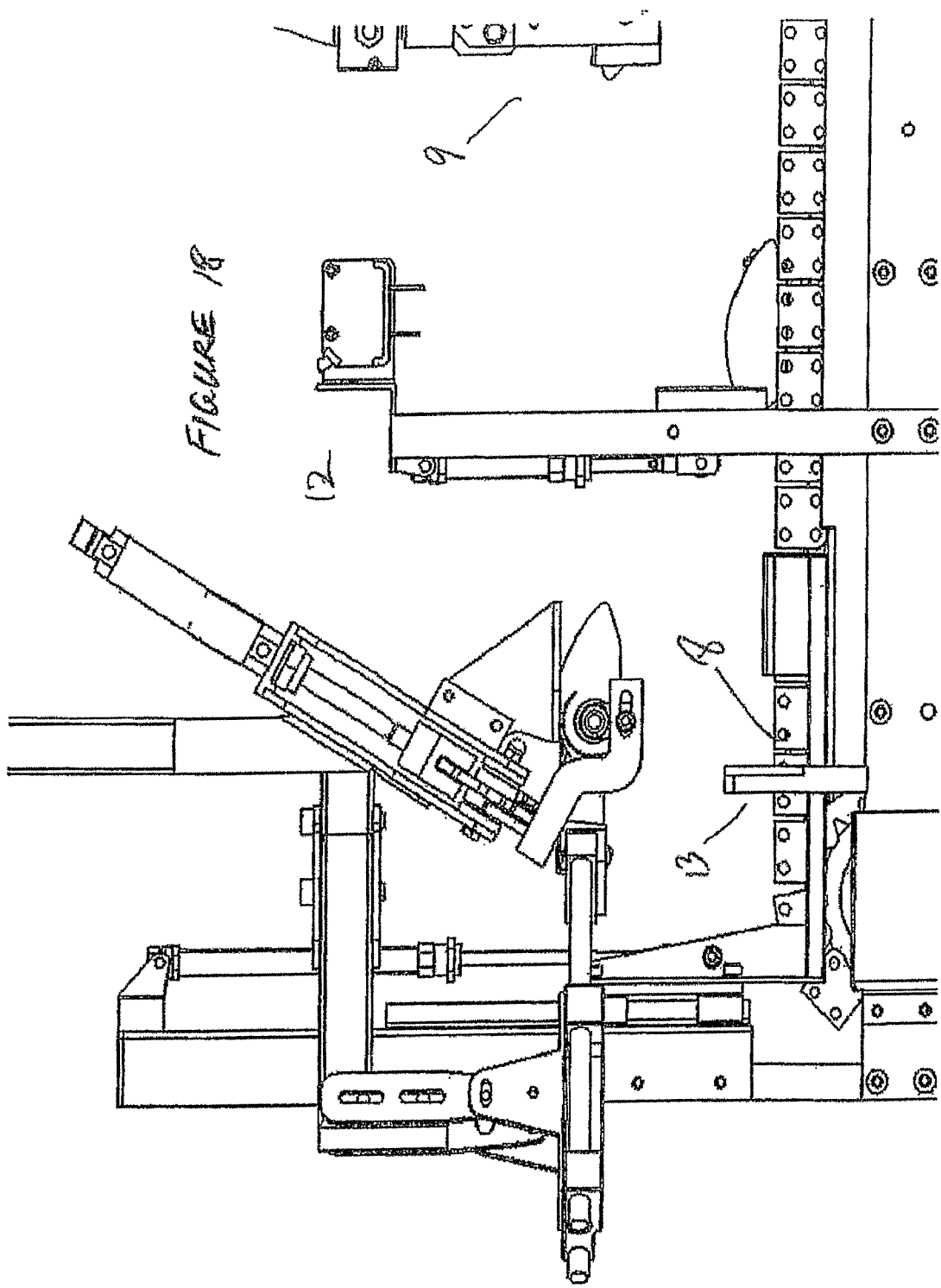

Conveyor 8 is a chain conveyor being operatively connected to activating means (for example motor 47 as seen in FIG. 15) and includes as shown in FIG. 11, a body 50 and movable chain comprising two walls of upright metal plates 51 and 52 being located on each side of the conveyor body 50 to form a specified space or width dimension therebetween for at least one mussel to sit in a substantially vertical orientation or lie on the mussel edge or mussel-join between the mussel halves. Later stations of the apparatus will detect and re-orient or reject a mussel if it is not in this general vertical orientation.

Orientation—FIGS. 5, 6, 11, 12 and 13

As shown in FIG. 11 a vision system 9 is used to image a mussel and vision algorithms are used to determine the mussel orientation. In this example a camera is operatively connected to an activating means and is located beside a mussel located on conveyor 8.

The reorientation device 10 is located beyond the vision system 9 and includes a vertically slidably mounted support 54 with two telescoping arm portions 55 and 56 being vertically rotatable in a horizontal plane (they rotate about a vertical axis) and having pneumatically operated end portions 57 and 58 which can move to grip a mussel and rotate it about a horizontal axis. Said reorientation device components 55-58 form a gripper 60 to grip a mussel to reorientate it.

The camera is acting as a line scan system, i.e., it uses a vertical line from each frame to determine the overall profile of the mussel as it passes by. The mussel is back lit to provide a strong silhouette. Once the profile of the mussel is measured, two algorithms are applied to determine the orientation of the point and the keel, respectively. The algorithm also takes into account the presence of the conveyor 8, which obscures part of the mussel profile.

The point detection algorithm compares the relative areas of the two ends of the mussel. The keel detection algorithm compares the relative areas of the top and bottom of the mussel. The vision system also determines the mussel length, which is used for the triggering of the reorientation device, and to check whether the mussel is on its side rather than its edge, in which case the mussel is ejected downstream.

In one cycle of the reorientation device 10 a mussel is reoriented from a keel down, point back orientation to the required keel up, point back orientation. This actually involves rotations about both axes as described below.

Figure 13:
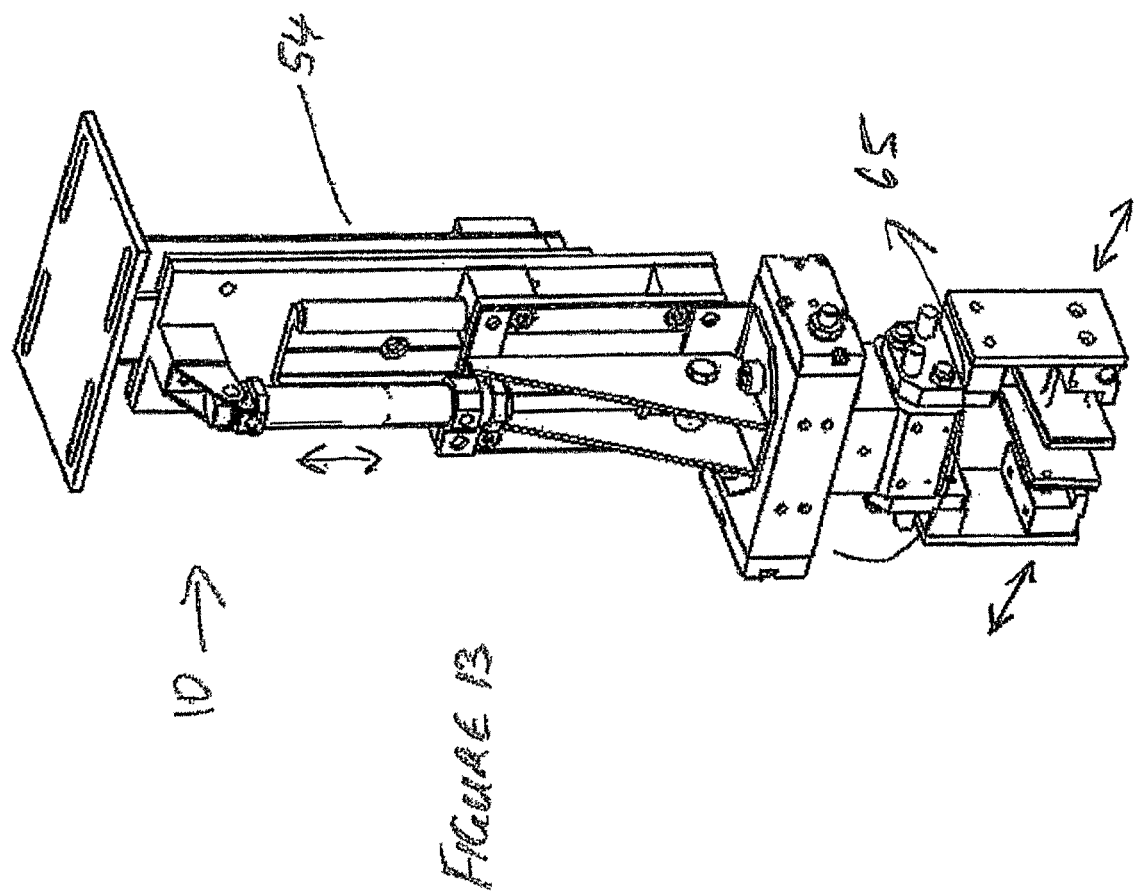

The reorientation device 10 of FIG. 13 consists of a pneumatic gripper 60, triggered by the vision system 9 that closes on the mussel as it moves along the conveyor 8. The gripper 60 is connected to another pneumatic system 61 that lifts the mussel up to allow sufficient space for the reorientation. The gripper 60 and pneumatic system are movably supported by the support means 54 which in turn is connected to the apparatus frame 2 of the apparatus. The gripper 60 includes the two arms 55 and 56 (having ends that can move towards each other in direction 62 as shown in FIG. 13 to grip a mussel.

Gripper 60 is rotatably mounted to enable rotation in the horizontal plane about a vertical axis. (See note earlier—the end portions 57 and 58 rotate to provide the second axis of rotation.) The reorientation device 10 also has two axes of rotation: one axis whereby the grippers rotate the mussel end over end—this is used to change the keel orientation (and, incidentally, the point orientation) whilst a second axis rotates 65 the gripper assembly end to end to change the point orientation without affecting the keel orientation. Once the mussel has been reoriented as required, the gripper is lowered down and opened to release the mussel back onto the chain conveyor 8.

Figure 14:
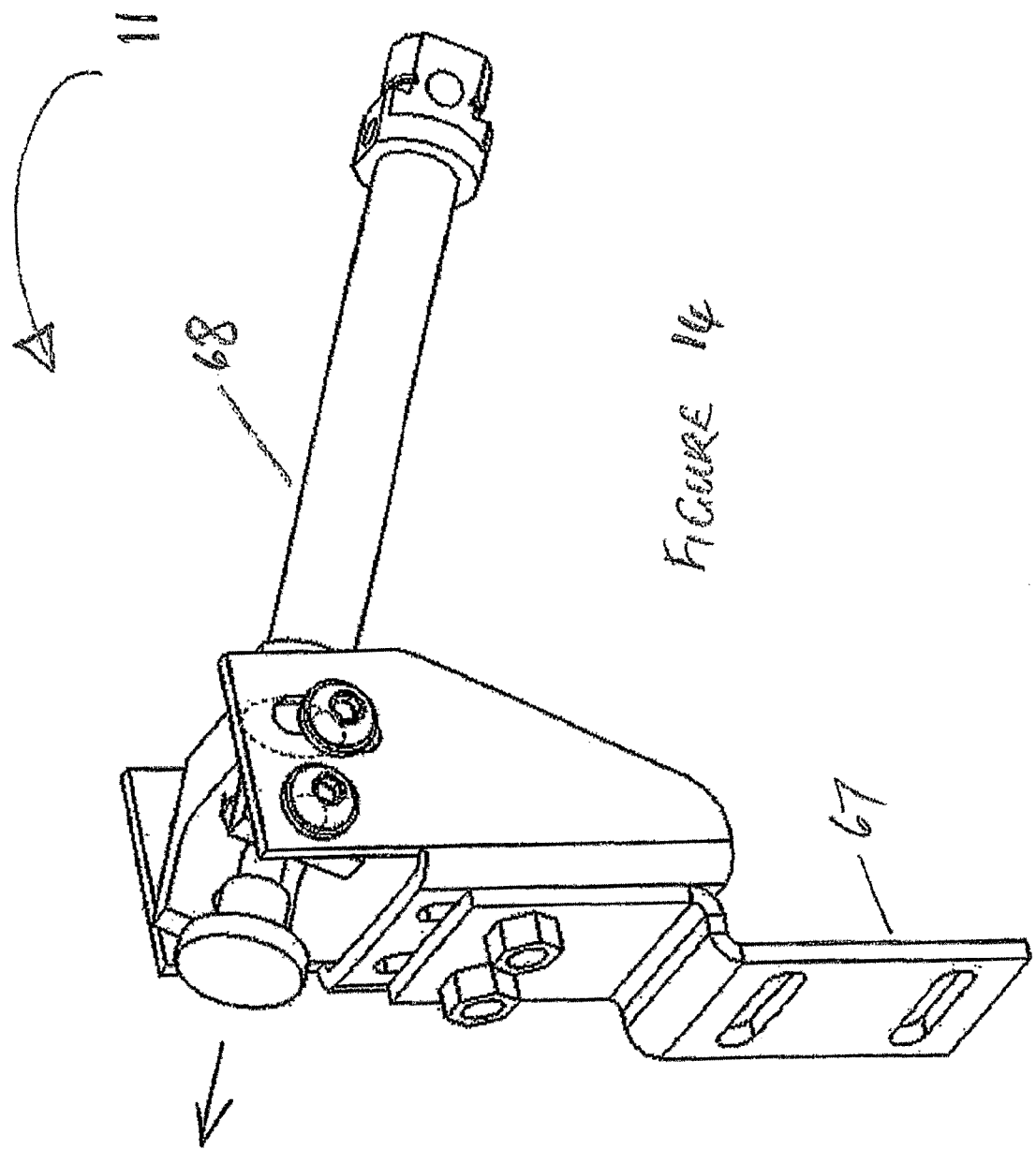

Adjacent device 10 as shown in detail in FIG. 14 is the ejection system 11 comprising a support member 67 and telescoping or piston assembly 68. Member 67 can be removably and supportively attached to the conveyor 8 as shown whereby piston assembly 68 can horizontally push off a rejected mussel (incorrectly oriented, incorrectly singulated or those of which the vision system 9 has been unable to determine the orientation) in response to sensing means via the vision system.

Figure 10:
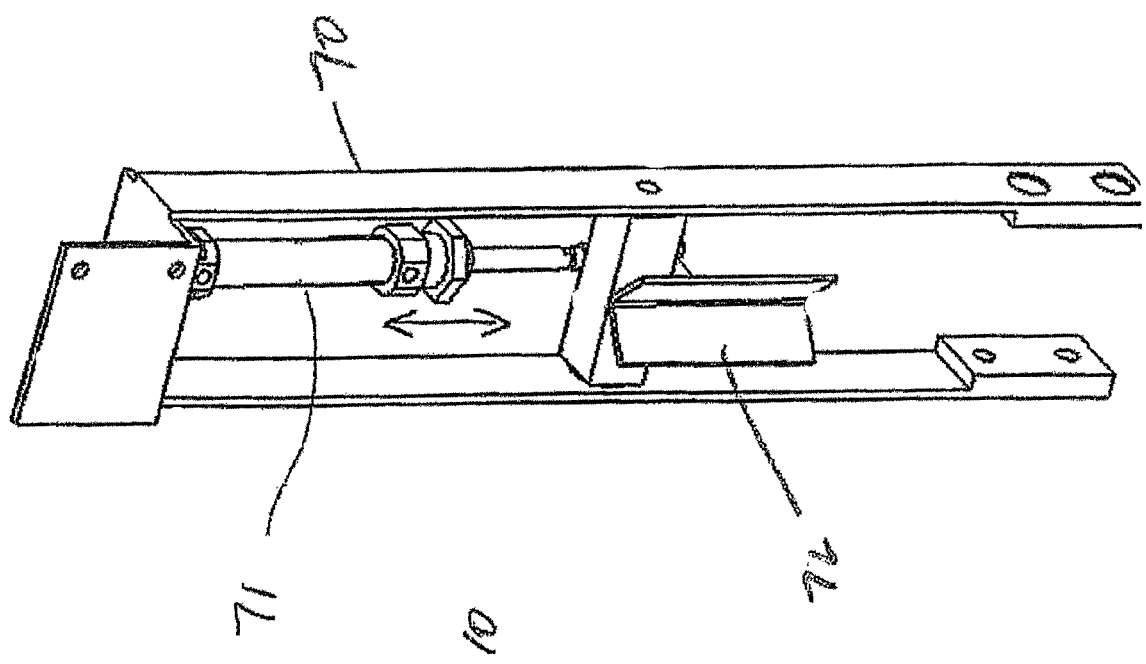
Figure 12:
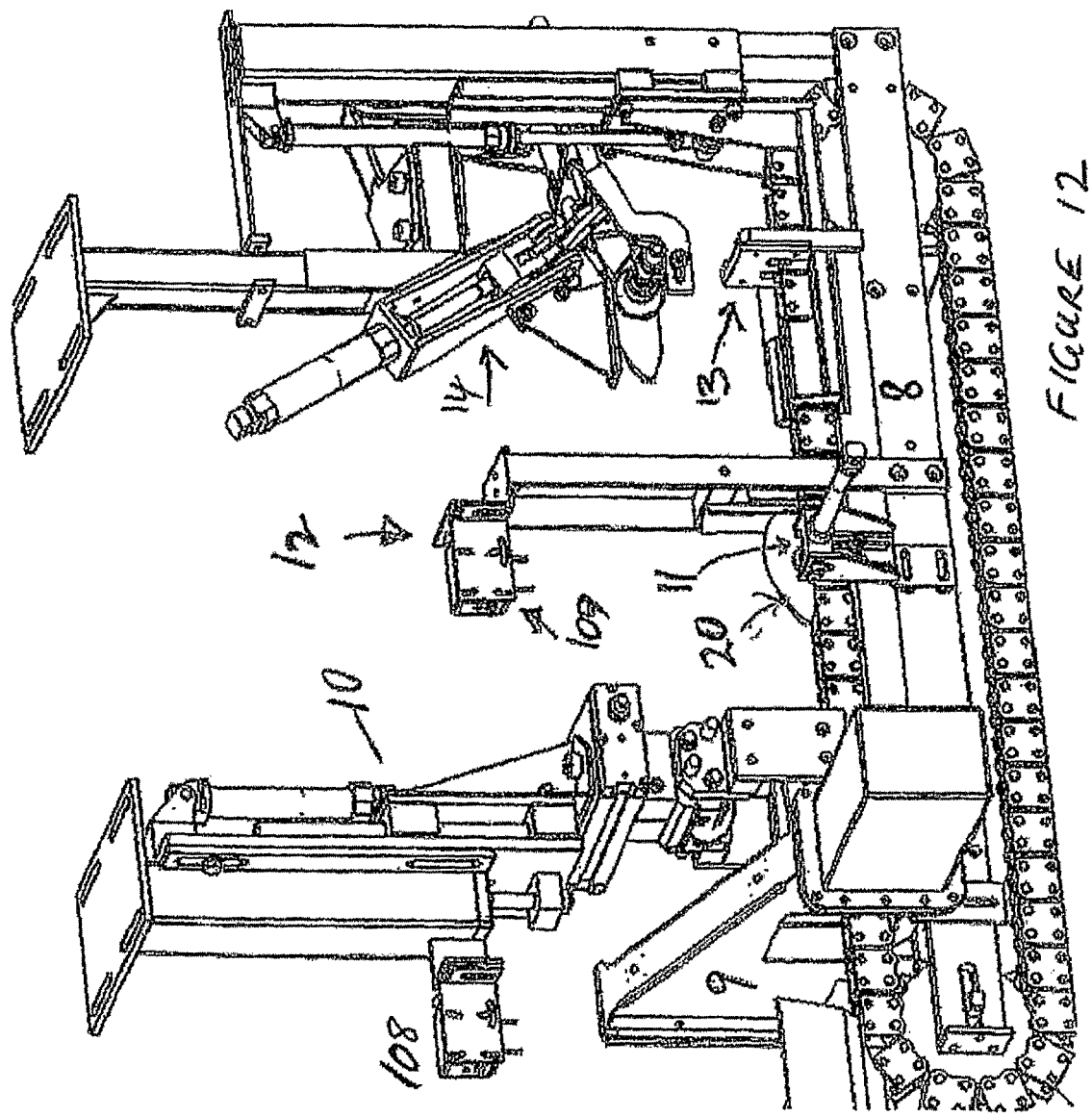

Referencing—FIGS. 10, 11 and 12

The vertical alignment device 12 as shown in FIGS. 10 and 15 is supportively attached to the conveyor body of conveyor 8 though the apparatus frame 2 or another support can be used as long as the device 12 can operate without obstructing the flow of mussels through the apparatus 1. Device 12 comprises a vertically mounted frame 70 that houses a piston rod mechanism 71 that includes at its distal end or operating end a vertical mounted angle portion 72.

Figure 19:
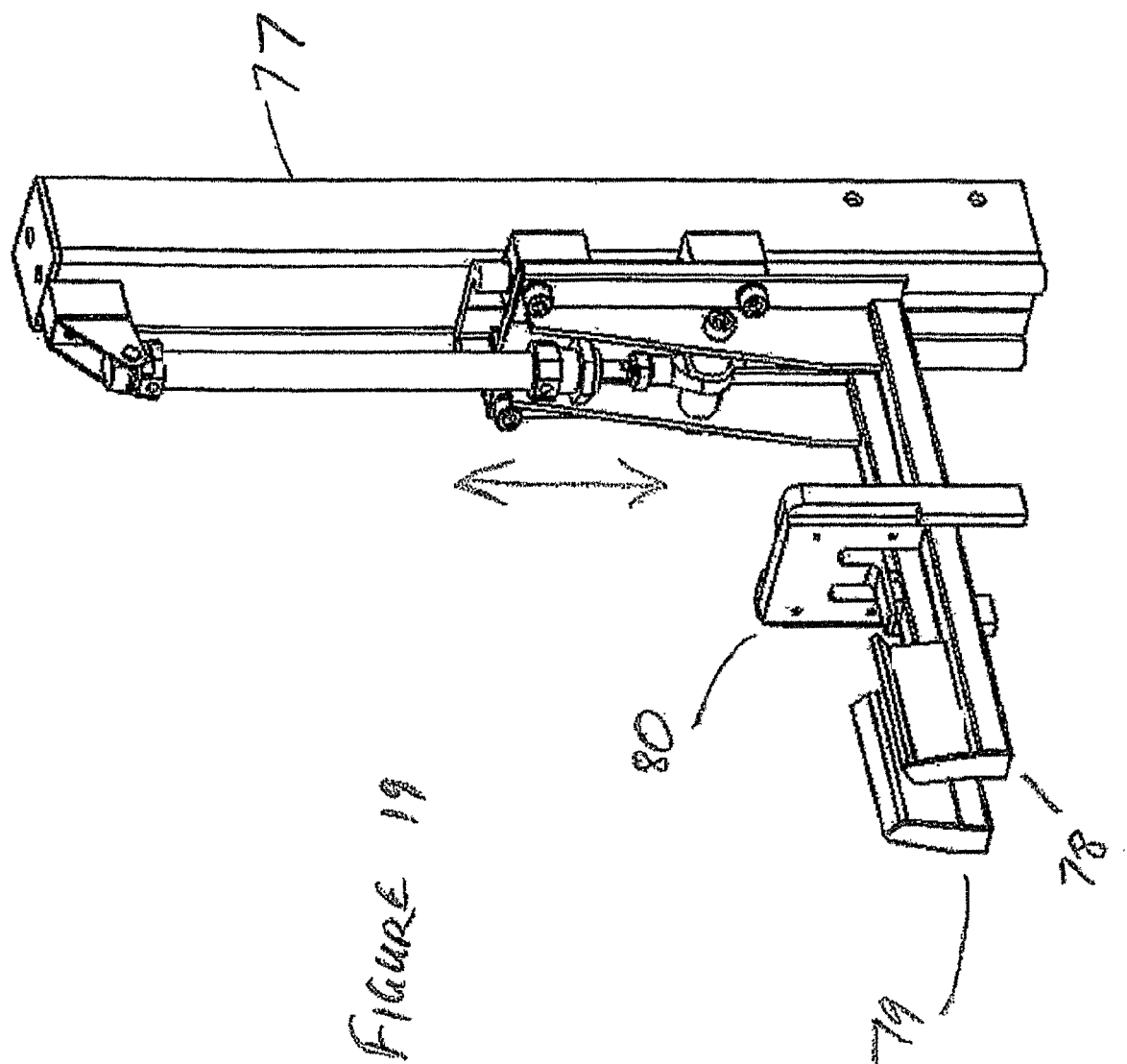
Figure 20:
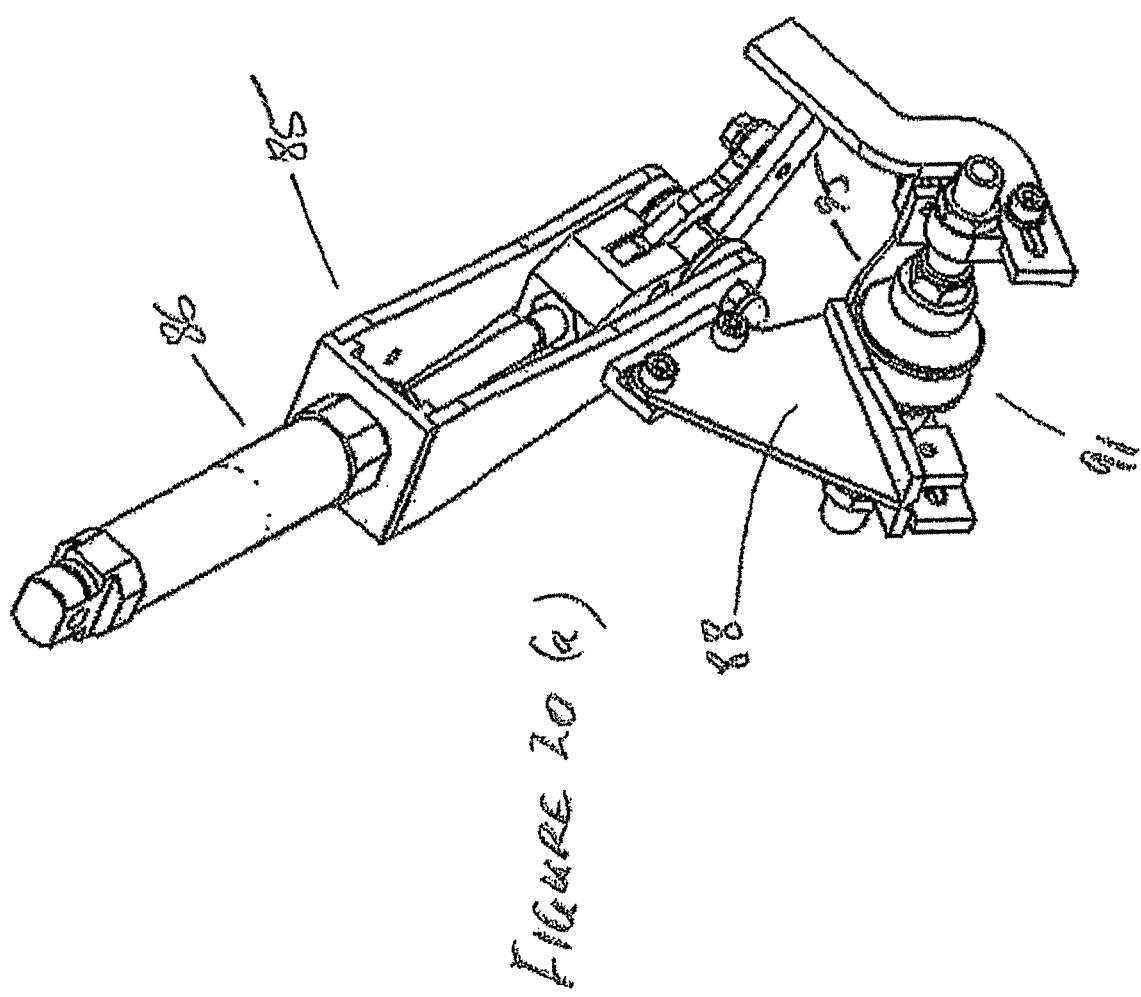

The apparatus has a combination of systems to reference each mussel to enable successful operation of the opening blade consisting of:
  vertical alignment using the vertical alignment device 12
  referencing of the leading edge of the shell against a stop 80 in FIG. 19
  referencing the keel of the mussel against the top stop 88 of holding means 14 in FIG. 20.
  The actual reference is the groove 95 on the underside as shown in FIGS. 20 (a)-(b).
  referencing the front edge of the waste shell using the profiled finger 96 and vacuum cups 91 as in FIGS. 20 (a)-(b)
a lifting device to transfer the mussel from the transport system to the opening head without losing reference.

Opening System—See FIGS. 14-21

Downstream of the vertical alignment device 12 is the opening system which includes various apparatus located above conveyor 8, such as the lifter assembly 13 (see also FIG. 19), the holding and opening assembly 14 (see also FIG. 20 (a)-(b)) and knife assembly 15 (see FIG. 21).

Lifter assembly 13 in detail in FIG. 19 comprises a vertically slidably movable carriage or platform 75 slidably attached to a vertical rail system 76. The vertical rail system 76 is attached to support 77 via a moving means in such a manner that allows the carriage to be vertically moved as required.

The carriage 75 includes two arms having upright guide members 78 and 79 thereon, whereby said guide members are able to straddle the conveyor 8 without interfering with its movement and stop member 80 is able to stop the front end of a mussel i.e. the leading edge 24. A mussel is moved by conveyor 8 through and between the arms whereby it is then stopped by stop member 80 and the mussel is then lifted for application of the holding and opening assembly 14.

Holding and opening assembly 14 is shown in detail in FIG. 20 which includes an overhead inclined support 85 supported by a part of frame 2 and housing a cylinder mount subassembly which includes a slidable piston member. Support 85 has a distal end or operating end having a pivotally sprung arm system 87 and a top referencing arm 88.

Sprung arm system 87 comprises two adjustable arms 89 and 90 having ends with suction means 91 on both arm ends to enable a mussel (which should be in a substantially vertical orientation with the leading edge in the forward position) to be picked up and held while the opening assembly 14 operates.

Suction means 91 is operatively connected to activating means such as a vacuum pump 92 and can include vacuum cups driven by a linkage system to grip, hold and open the shells of a mussel. Top referencing arm or hinge breaker 88 comprises a 'T' bar cross sectional shape with a web portion 93 being supportively linked to holding assembly support 85 and a bar portion 94 comprising a flat planar member having a groove 95 to help align the mussel and an asymmetric profile 94 to ensure the two shells are separated.

Holding and opening assembly 14 also can include a profiled finger 96 whereby in use a mussel is firstly gripped by the suction cups and pulled apart to engage on the profiled finger and to form a gap between the shellfish halves whereby the knife of the opening assembly is then inserted to separate the adductor muscle so that then the vacuum cups further pull the two halves completely apart against the hinge breaker 88 whereby the mussel hinge is broken.

Knife assembly 15 is shown in detail in FIG. 21. Knife assembly includes a movably supported structure 100 having an arm 101 movably attached thereon. Arm 101 has pivotable joint means 102 which is slidably attached to knife means 103. Knife means 103 includes a replaceable blade.

After the adductor muscle is cut by the knife means 103, the shell halves still being held by each suction cup, can rotate in a substantially vertical plane with each shell half about the groove 95 of the hinge breaker 88 in a sort of vertical rolling action in opposing directions-splaying action. The axis of rotation is actually about the axis of the pivot on the opening head which is approximately co-axial with the line of the hinge. The hinge breaker 88 ensures the mussel doesn't rotate away from this position and also levers apart the two mussel shells.

All the components assemblies are operatively connected together via an operating system which enables control of their speed and coordination with all the other devices. Problems and speed can be monitored. The apparatus is designed and intended to run continuously. There will be a number of mussels being processed within the system at any one time to obtain the desired throughput rate. The apparatus includes various stations with different apparatus, devices which operate simultaneously and in parallel to achieve a high processing through-put.

Figure 2:
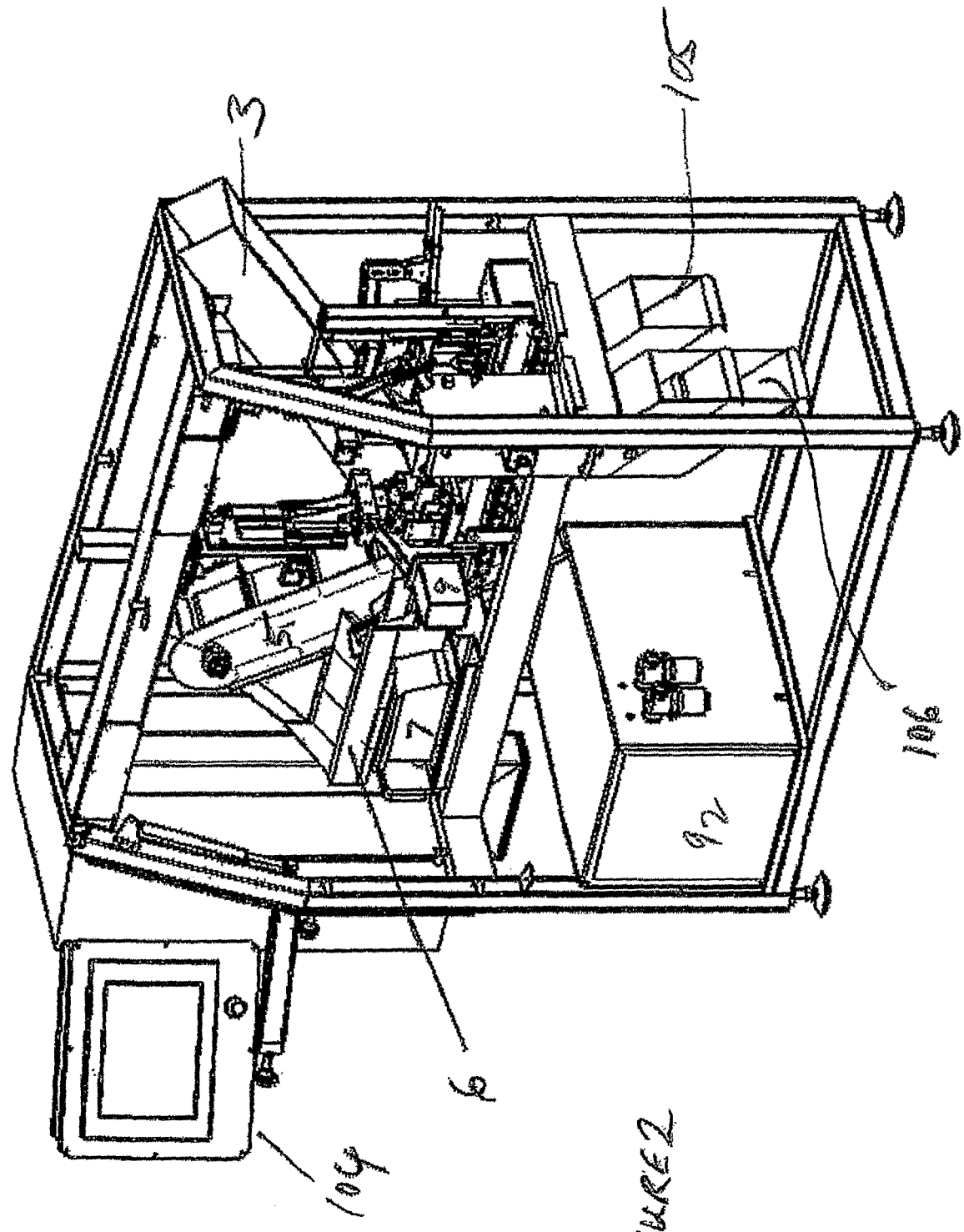
Figure 3:
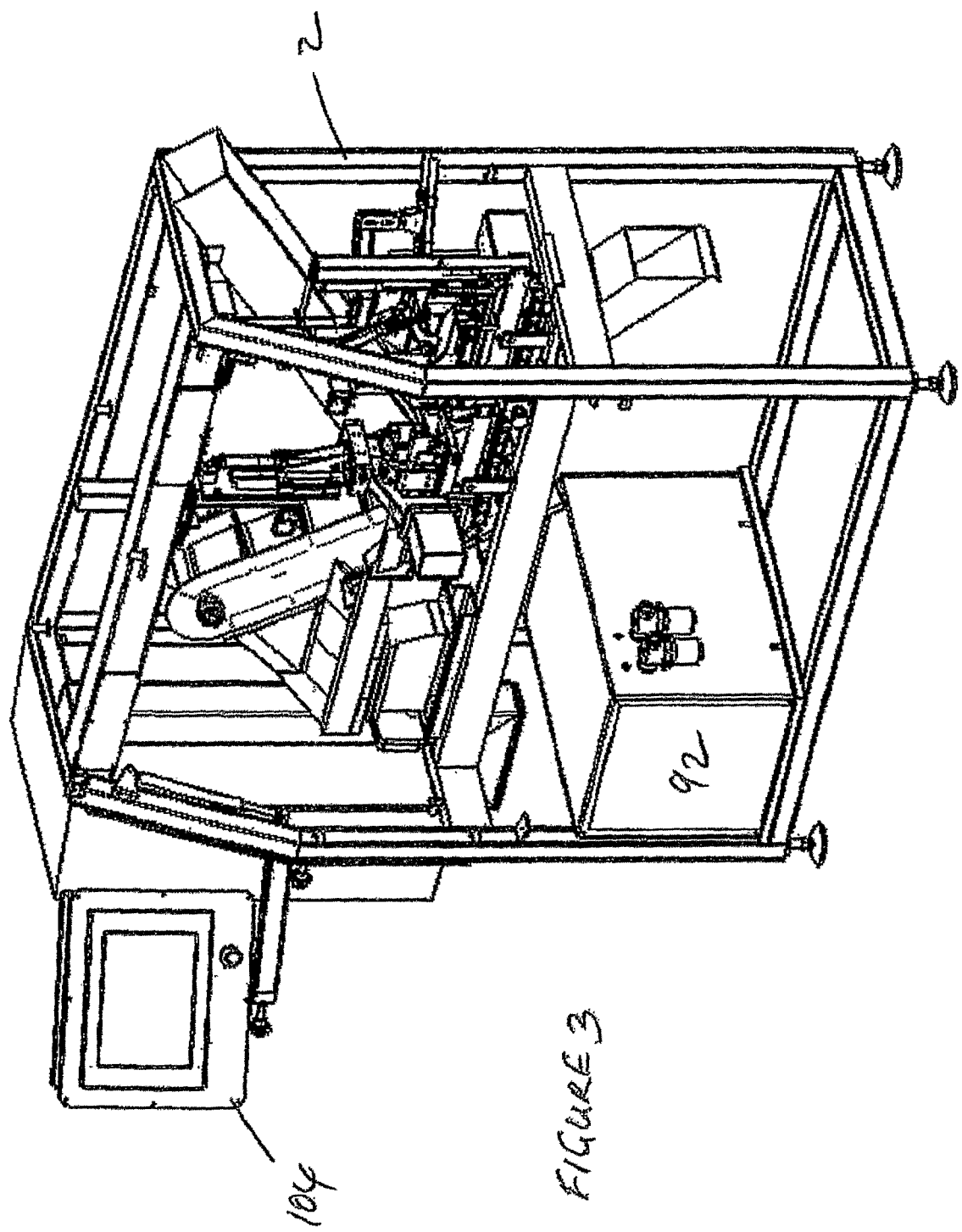

As shown in FIGS. 1-3 the apparatus can include various control means 104 which can include a viewable screen e.g. LCD and Human Machine Interface (HMI) and control cabinet to assist in the checking of progress and any problems whereby both manual and machine and automatic control is possible.

As shown in FIGS. 1-3 there can be two out-feed chutes with one being a product out-feed chute 105 and the other being a waste and rework chute 106 whereby a diversion flap can be activated to ensure any product that is not waste does not go out the waste stream.

The single chute 105 is for product and also for unopened mussels ejected by the ejection device. The double chute 106 is used to separate, by means of a diversion flap inside the chute, waste shells from mussels that may not have been correctly processed, referred to as rework. The logic works like this:

The default position of the diversion flap sends product to the rework part of the chute (the upper exit) if and only if the two vacuum cups are sensing that they are both still holding onto mussel shells once they are fully retracted, the diversion flap is moved to the waste position and the waste shell is released down the chute to exit out the lower exit.

In all other situations, the diversion flap remains in the default position so that any mussel that is incorrectly processed, e.g., knocked out by the knife or has the product shell still attached because the hinge isn't fully broken and the product shell has come away from its vacuum cup, will not go to waste but exit out the rework chute.

Note that the upper exit of chute 106 and the exit of chute 105 are at the same level so that they can both feed onto a common out-feed conveyor to take product and rework away from the machine.

The apparatus and its various machines or devices or assemblies can be powered using single phase mains power (240V). This powers the vacuum pump, the 3-phase drive motors for the two conveyors 5 and 8 as well as the control system 104 (PLC, PC for the vision system and HMI, and sensors). The apparatus is also supplied with compressed air to drive the various pneumatic actuators such as for example for the reorientation assembly 10, holding and opening assembly 14. The other services to the apparatus are the chemicals and water, including high pressure water, for the Clean In Place (CIP) system.

The apparatus can have a number of sensors such as:
Hopper fill sensor 107 senses when the hopper 4 is too full or too empty.
Mussel presence sensor 108 as labelled in FIGS. 5 and 12 at the exit of the in-feed tray 45: used to ensure mussels are singulated as they transfer to the conveyor 8.
Mussel presence sensor 109 at the vertical aligner 12.
Mussel presence sensor at the loading system of lifter assembly 13 to check when a mussel has reached the leading edge reference stop 80. This sensor is not shown on any of the drawings as it is a very small sensor attached to the side of the product chute 105.
Reed switches (not shown) are mounted on some of the cylinders to determine when they are at a certain position, usually, but not always, fully extended or fully retracted. These are used to control the timing of the system by identifying the various states of the machine.

Additional sensors can be used as required. For example a sensor to help with the feed and singulation of the mussels from the in-feed tray to keep the in-feed tray vibrating if there is a gap in the mussel stream entering the apparatus for processing. This can assist in ensuring the maximum possible throughput.

The vision system uses a camera as already described.

There is no direct relationship between the sensors and referencing as the referencing is achieved using mechanical stops. The sensors are used to detect that a mussel has reached a stop.

The LCD screen is part of the PC that controls the vision system. It also acts as the HMI for the machine. It can be a touch screen that displays various operating modes and parameters to the user. The camera is connected directly to it using a FireWire cable run through conduit via the control cabinet. The program running on the PC communicates with the PLC to enable changes and display of the various control parameters. There is a flexible conduit between the control cabinet and the HMI enclosure which also carries the power supply and a connection to a USB port on the PC. There is also a connection to the emergency stop button that is located on the HMI enclosure.

FIGS. 22-32 relate to a second embodiment of the shellfish positioning and opening apparatus 200. In summary this apparatus 200 utilizes similar components of the previous apparatus whereby the following are still used such as the reorientation device assembly, vertical alignment device, lifting or loader assembly, holding & opening assembly and knife assembly. There have been some minor modifications to these but in essence they still function as previously disclosed in this specification.

The main differences are in relation to the in-feed portion and general layout. The in-feed portion now uses a trough to roller system and the apparatus as a whole operates with two parallel lines of shellfish processing from a single in-feed hopper. This means that there are two hopper in-feeds leading to two lines or lanes of shellfish processing whereby there are two reorientation devices and two vacuum cup assemblies and two knife assemblies. This two line processing is only one example as there may be at least one processing line or as many lines or lanes as required.

Figure 22:
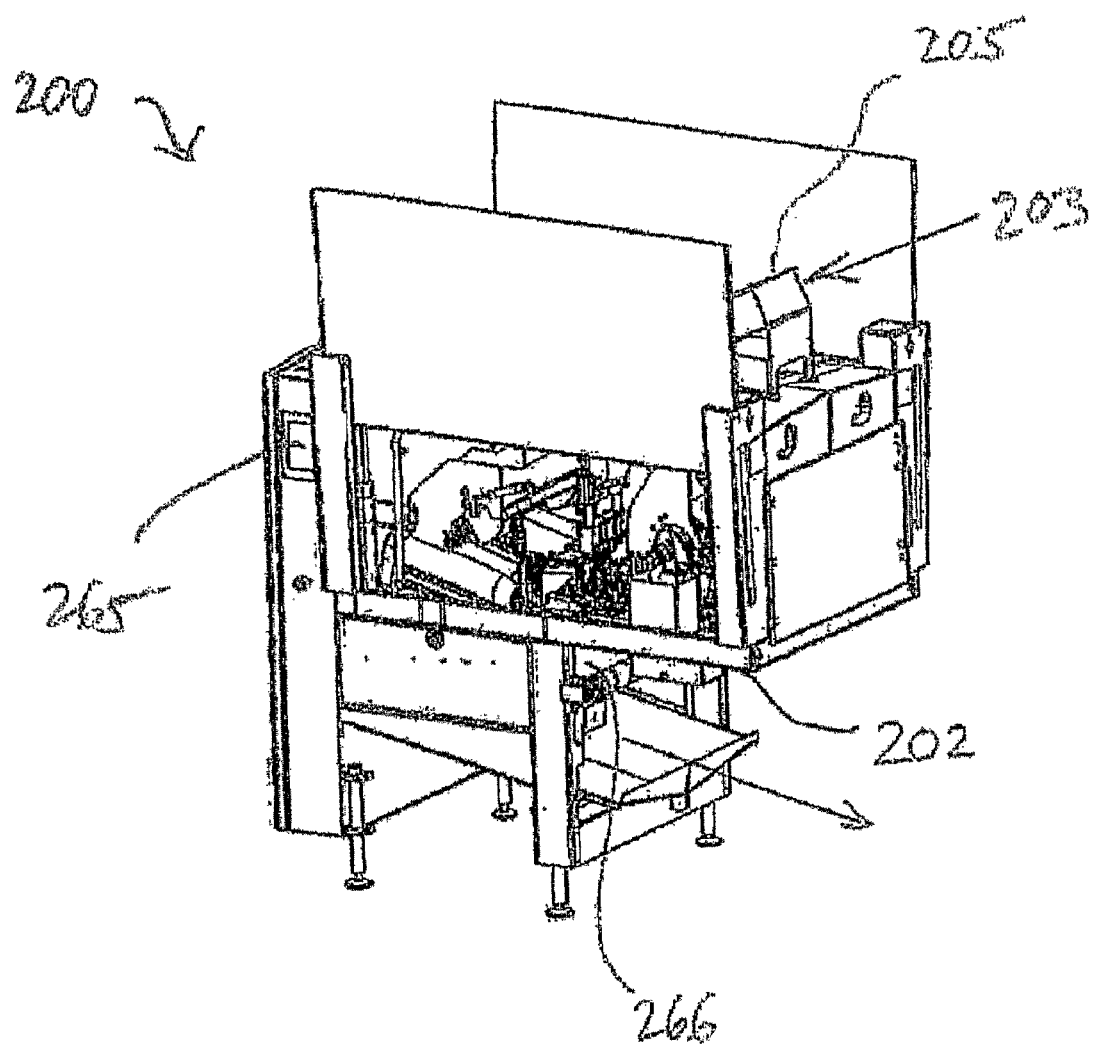
Figure 23:
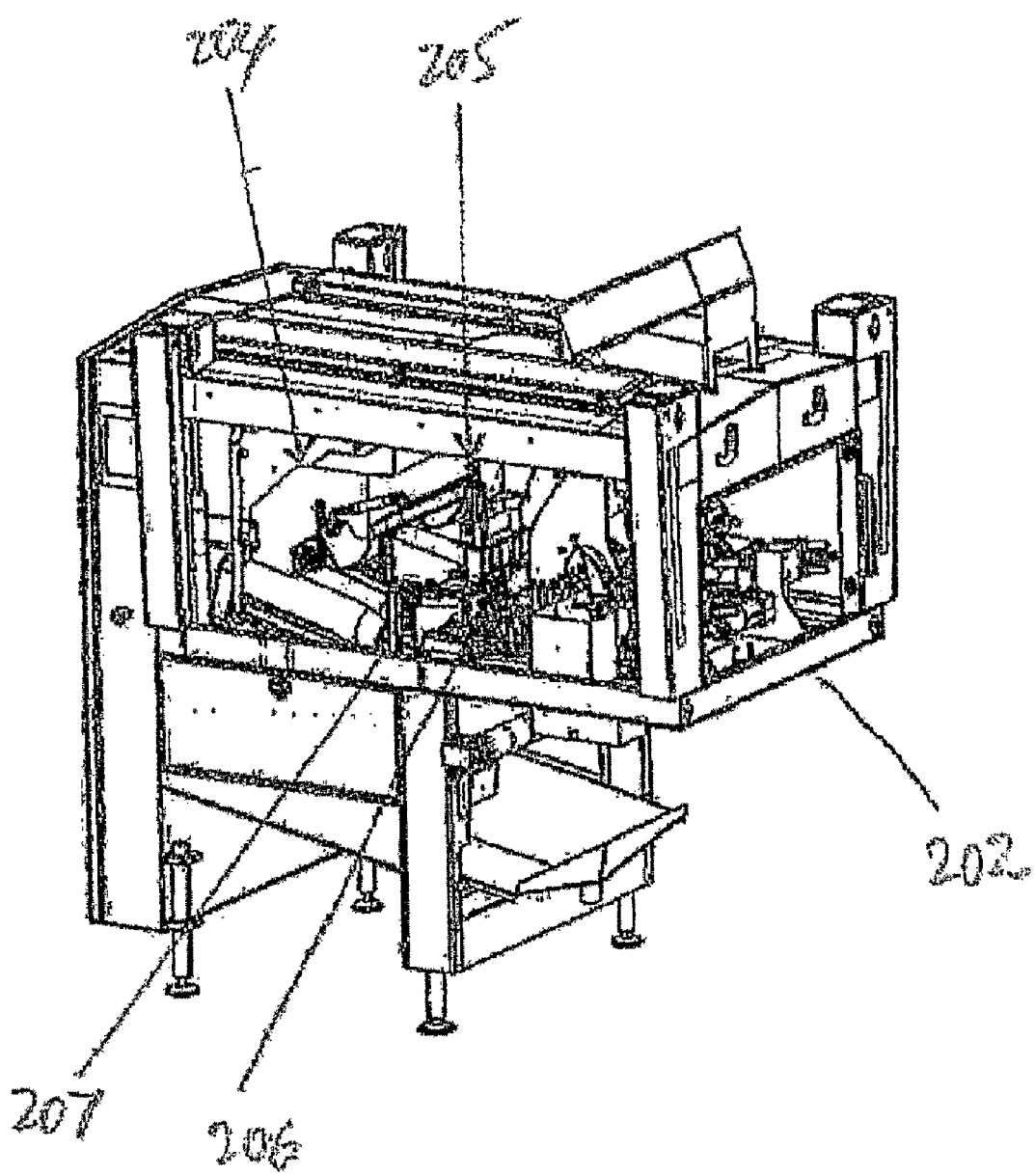
Figure 2C:
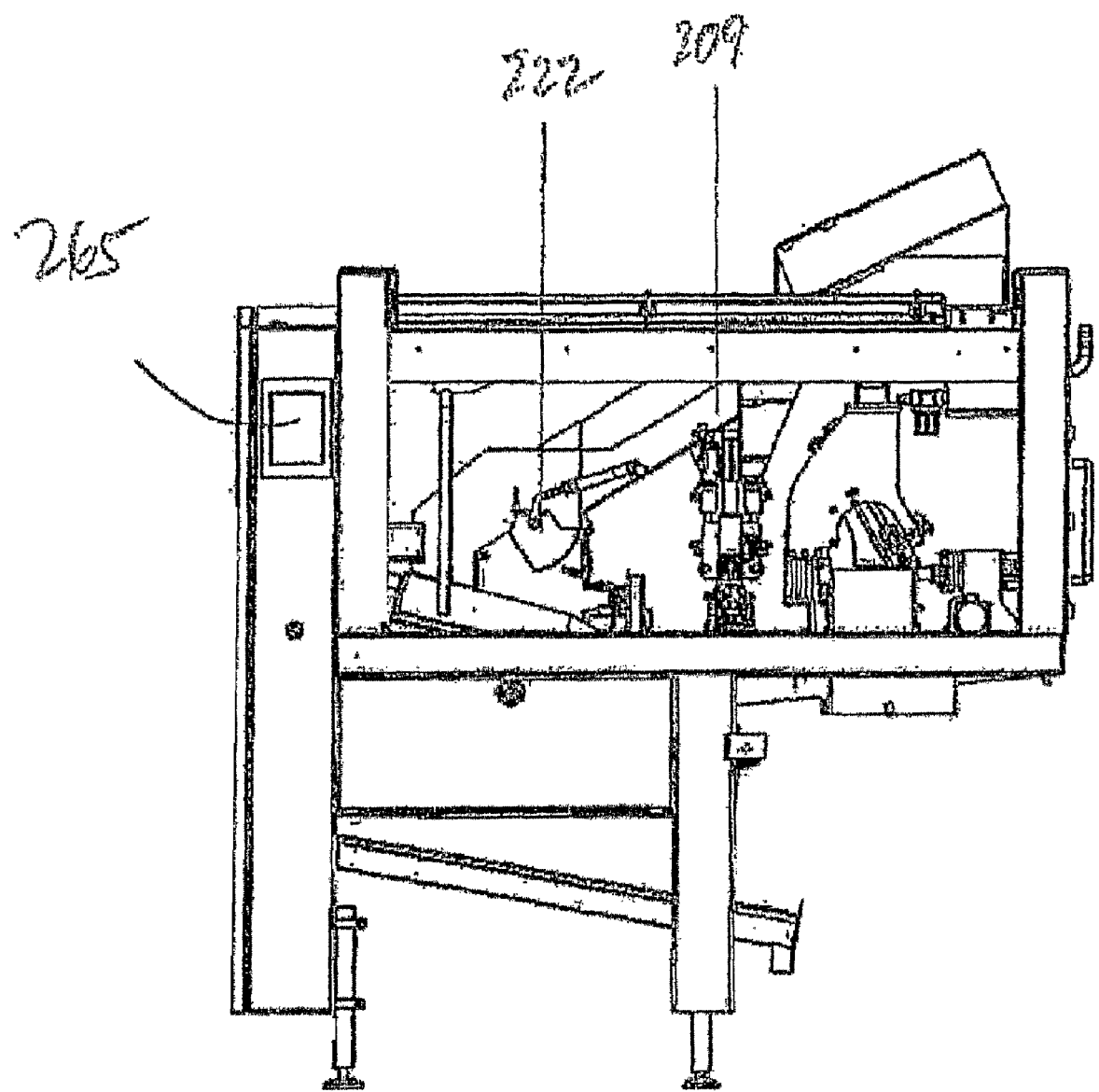
Figure 32:
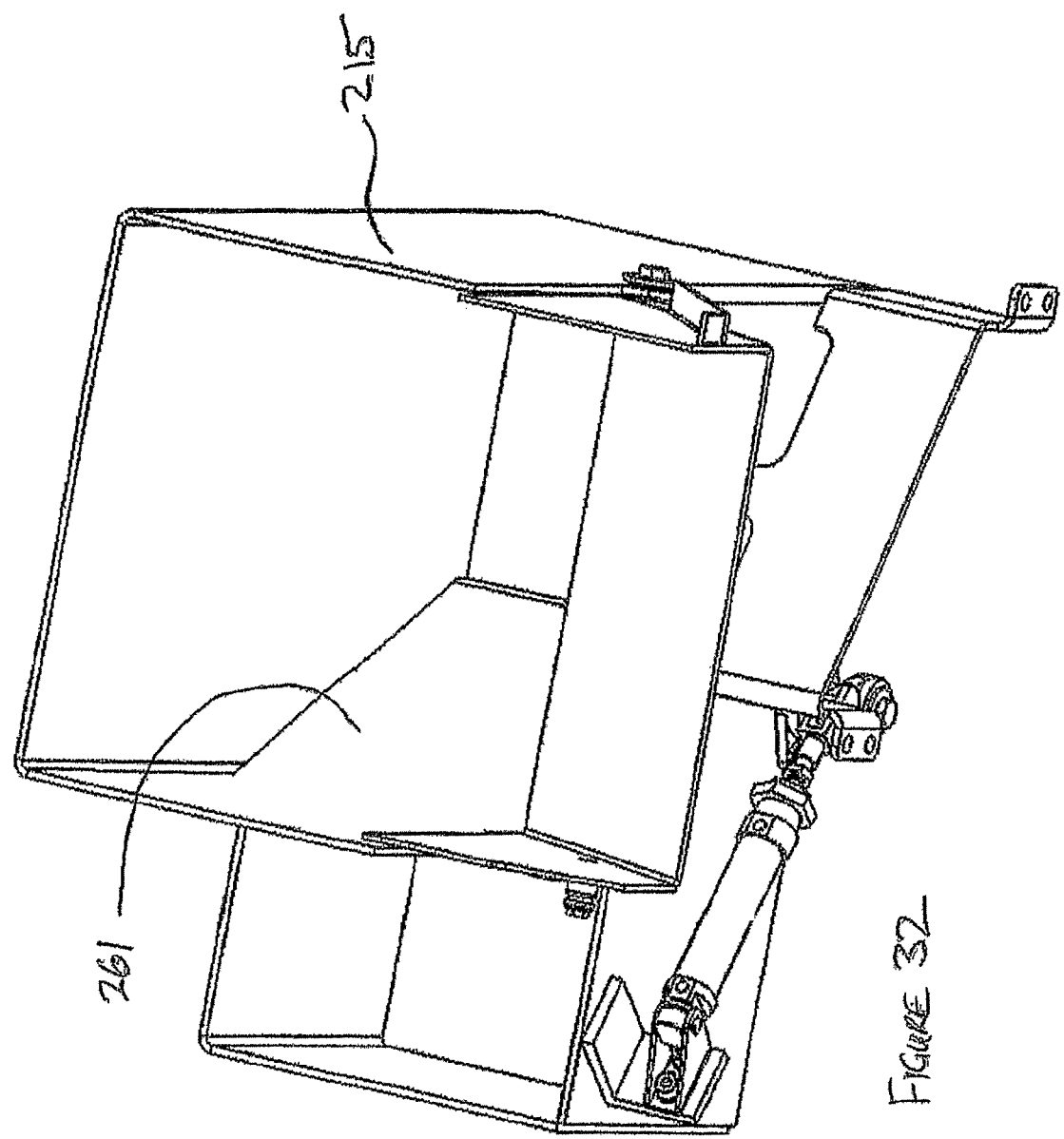

As shown in FIGS. 22-24 apparatus 200 includes a supporting frame 202 which can include various components such as legs, casing or housing and guards being removably and fixedly attached together. Apparatus 200 includes the following general process components of in-feed 203, singulation and orientation, conveying 206, vision system 207 (see new FIG. 26), primary ejection 208 (see FIG. 26), reorientation device 209, vertical aligner 210 and secondary ejection 211 (see FIG. 26), lifting assembly 212, holding and opening head 213, knife assembly 214 and out feed chutes 215 (see: FIG. 32 shows the one of the out-feed chutes), which generally follow the same process steps as shown in FIGS. 1-21.

In summary the main components for assemblies 1 and 200 are:
- In-feed chute 3, Hopper 4, Lifting conveyor 5, In-feed tray 6 and vibration means 7, 204 & 205
- Chain conveyor 8, 206
- Vision system 9, 207
- Reorientation assembly 10, 209
- Ejection system 11, 208/211
- Vertical alignment device 12, 210
- Lifting assembly 13, 212
- Holding and opening assembly 14, 213
- Knife assembly 15, 214

The fundamental control philosophy for this process is open loop for the product feed along a conveyor and through an opening head. This means that product is pushed onto the conveyor at a time interval that is no less than a set minimum time. This time is slightly longer than the slowest operation in the opening process, i.e., reorientation, vertical alignment, loading or opening.

At the end of the line for the shellfish positioning and opening assembly 200 you get shellfish meat on one shell half and one empty shell, every second.

Process Description

In-Feed 203

Figure 25:
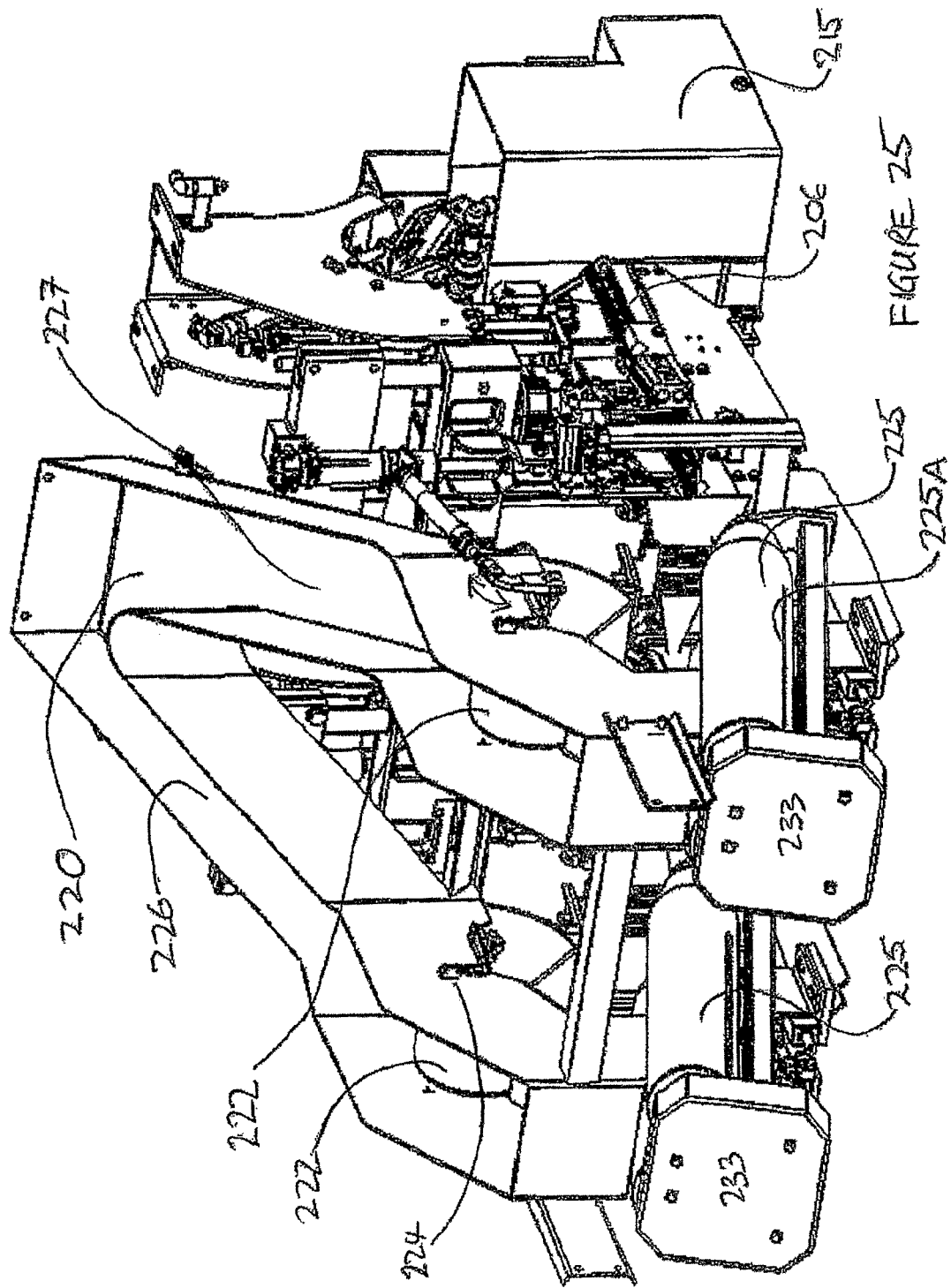
Figure 26:
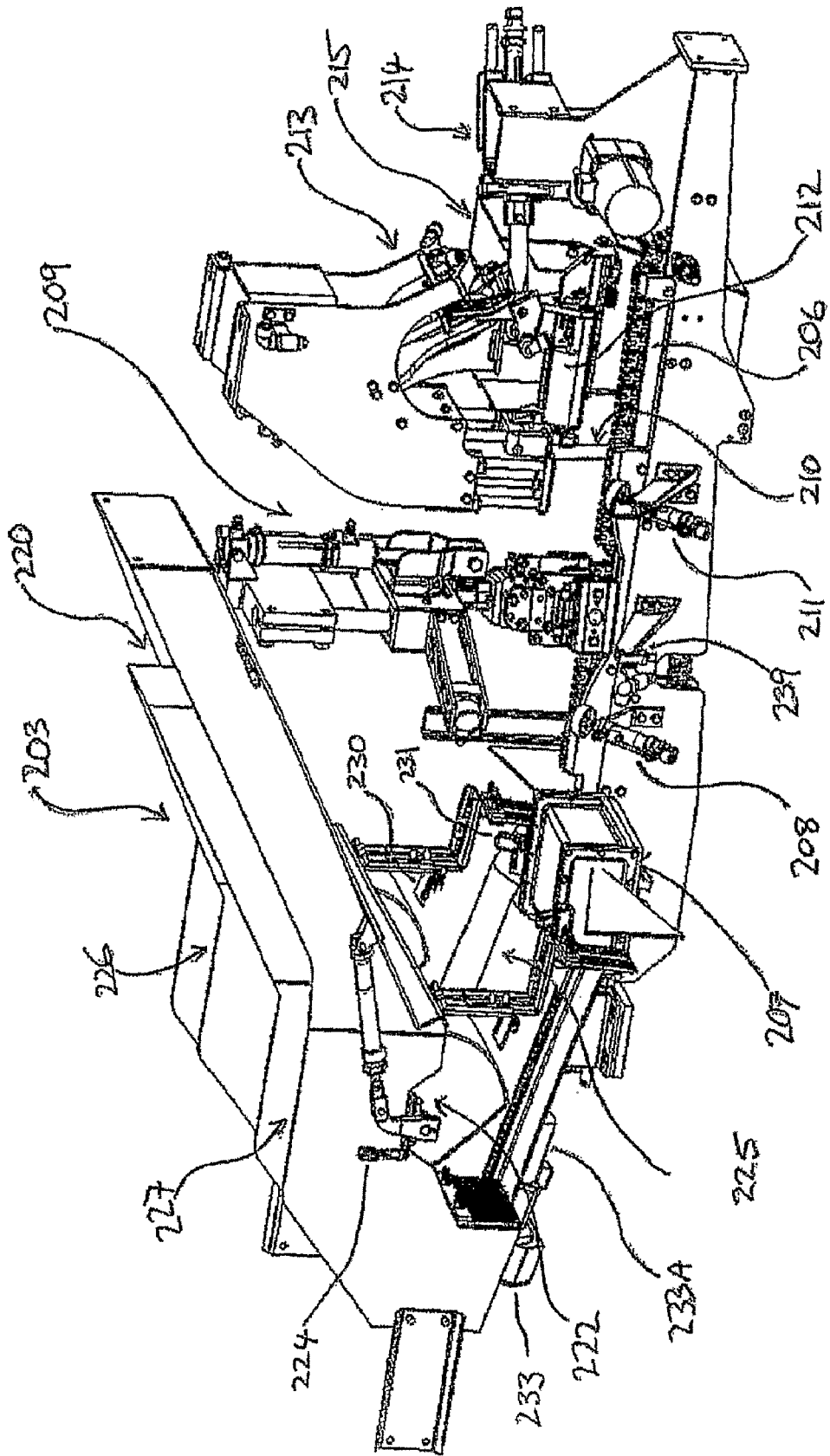

As shown in FIGS. 25 and 26 hopper in-feed member 220 operatively connects to two hopper in-feed members 226 & 227 with each member being shaped as an open channel member. Each hopper in-feed member 226 or 227 leads to the scroll feeders 222 and hopper out feed sensor 224 which act as distribution control means which inturn provides a prescribed time and number of shellfish to singulation rollers 225.

Each scroll feeder 222 controls the delivery of mussels from the hopper to the singulation rollers 225. Each scroll feeder 222 comprises a rotatable floor portion that interfits with the floor of the channel members 226 & 227, that floor portion in use rotates or rolls forward and back and has a step that lifts say 2-3 mussels at a time and drops them onto the singulation rollers (see FIG. 25). It effectively replaces the lift conveyor 5 as shown in FIG. 9 with the step in the scroll acting as a flight.

- A feed conveyor which is not covered by this patent specification runs continuously and is externally controlled whereby mussels are fed to the hopper in a controlled manner.
- Hopper 220 feeds two Scroll Feeders 222 that feed shellfish (for example, mussels or product) to the two lanes of the apparatus 200.
- Scroll feeders 222 act independently and are pneumatically activated.
- Scroll feeders 222 are activated by a sensor 223 mounted under cover 233 at the upstream end of singulation rollers 225("Roller In-Feed Sensor").
- Scroll feeders 222 are retracted by a sensor 224 on the scroll ("Hopper Out-Feed Sensor")

Singulation and Orientation 204 & 205
- Singulation and orientation is carried out by the singulation rollers 225, which also align the mussels on edge, generally in a keel-down orientation (see FIG. 4 for keel edge 23).
- One of the singulation rollers 225 has two slightly raised ridges 225A which jog the mussels into an on-edge orientation.
- The singulation rollers 225 rotate in the same direction.
- Final singulation occurs across the transition to the conveyor 206. This is located on the apparatus 200 where the singulation rollers 225 taper down and meet the main conveyor 206, just before the vision system 207)
- Two sensors control singulation:
  - A first sensor 230 near the end of the rollers 225 detects mussel presence prior to the transfer to the conveyor 206 ("Roller Out-Feed Sensor 230").
  - A second sensor 231 on the conveyor 206 ("conveyor singulation sensor 231") detects the leading edge of a mussel and stops the singulation Rollers 225 if a mussel is detected at the end of the rollers 225 by the roller out-feed sensor 230.
  - The following mussel is fed after a given delay from the trailing edge of the previous mussel (product push) as determined by the conveyor singulation sensor 231.
- Rollers 225 are driven from a Variable Speed Drive (VSD)-controlled 3-phase motor 233, with the speed set directly on the VSD. as shown in FIG. 26

Conveyor 206
- Main transfer conveyor 206 through the machine 200 for the singulated mussels.
- Driven by a VSD-controlled 3-phase motor, with the speed set directly on the VSD.

Vision System 207
- Mussels are conveyed past the vision system 207 which can include a camera, which determines the mussel orientation and also checks for mussels that are too close, on their side, or whose orientation cannot be determined.

Primary Ejection Station 208 as Shown in FIG. 26

Mussels identified by the Vision System 207 as needing ejection are knocked off the conveyor 206 on the fly prior to the reorientation device 209 by the primary ejector 208.
- Ejection system is driven by a pneumatic cylinder.

Figure 27:
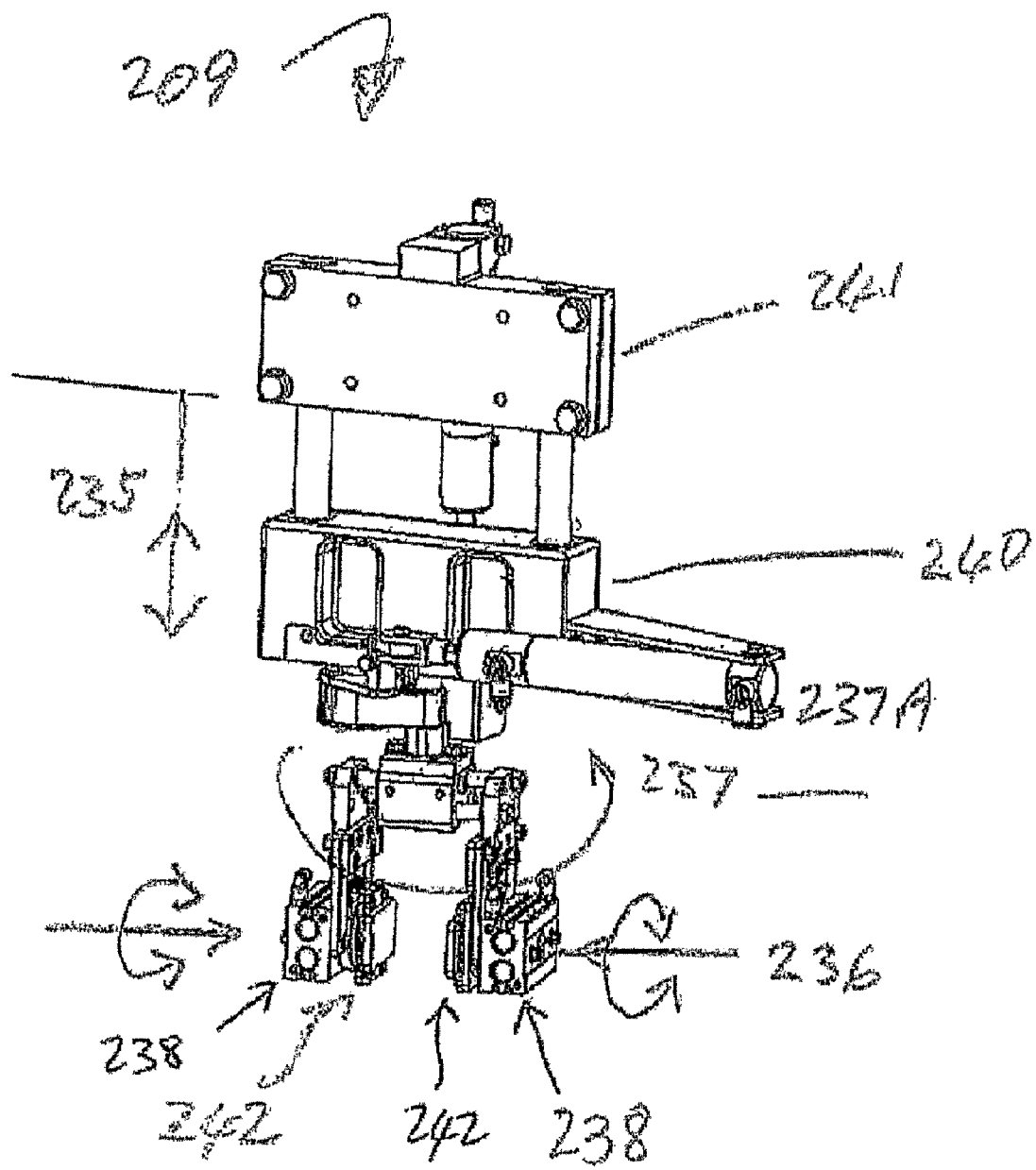

Reorientation Device 209 as in FIG. 27

Reorientation device 209 is similar to the device labelled as '10' as shown in FIG. 13. In general the device 209 is able to reorient the product such as a mussel in four axes. The lifting axis 235 relates to a vertical slidable movement of a lower portion 240 with respect to an upper portion 241 of the device 209. Grip axis 236 relates to a pair of opposing grip blocks 242 which in use move horizontally together to grip the mussel in the first instance to allow for the other axis movement as required.
- For the point orientation each mussel is rotated in the horizontal plane by component 237. The keel orientation is achieved, by rotation of the actuators 238. They rotate in the vertical plane about a horizontal axis as shown in FIG. 27. Note that the grip blocks 242 are attached to the keel orientation actuators 238.
- The conveyor deflection sensor 239 (see FIG. 26) is located at the reorientation device 209. When the reorientation device 209 is lowered to put a mussel back on the conveyor 206, the mussel touches the conveyor 206 causing it to deflect (the conveyor 206 is unsupported at this point). The deflection is detected and the gripper 242 in the reorientation device 209 opens, releasing the mussel. The reason this is necessary is that the machine has to cope with a wide variety of mussel sizes. If the reorientation device 209 picked up and dropped off mussels at the same position, some mussels would drop from height after reorientation and some mussels would be forced onto the chain of the conveyor. This system should reduce the number of mussels that fall off the chain at the reorientation device compared to the first system of FIGS. 1-21.

Reorientation device 209 picks up mussels off the conveyor 206, reorients them based on the information from the vision system 207 in comparison to established stored desired product orientation and places them back on the conveyor 206.

Four axes as shown in FIG. 27
    Lift 235: single cylinder ("Reorientation Lift") providing a vertical movement and rotation
    Grip 236: single pneumatic actuator ("Reorientation Grip") in the horizontal direction.
    Point orientation 237: single cylinder ("Point Rotation") using a horizontal rotation
    Keel orientation 238: two pneumatic rotary actuators ("Keel Rotation") using vertical rotation Reorientation device 209 operating sequence:
    Grip on trigger from vision system 207
    Lift fully and then reorient point and keel
    Lower and open gripper when conveyor deflection detected by a Conveyor Deflection Sensor 239 or when Reorientation Lift is fully extended Vertical Aligner 210 and Secondary Ejector 211

The vertical aligner 210 of FIGS. 22-32 is simply a piece of angle similar to that of the vertical alignment device 12 of FIGS. 1-21. In operation of the apparatus, a mussel on the conveyor 206 runs up to the angle and is stopped by it. The mussels run into the corner of the angle and are thus aligned in the vertical plane. The vertical aligner 210 ideally never lands on top of a mussel but is lowered after a mussel has passed and before the next mussel arrives.

Figure 28:
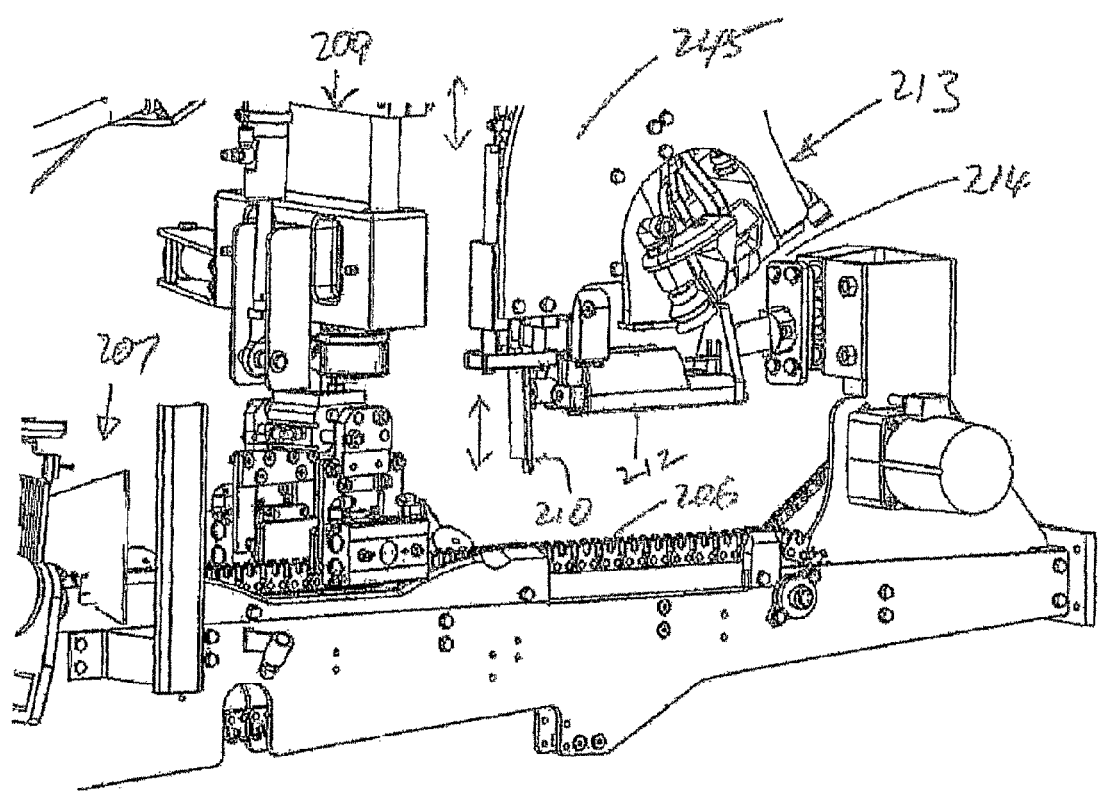

The secondary ejector 211 as shown in FIG. 26 at this point functions primarily to enable the apparatus to be emptied quickly and automatically. As shown in FIG. 28 vertical aligner 210 can be formed as part of the supporting structure for the loader 212 or it can be formed as a separate item above the conveyor 206.

Mussels are held briefly at the vertical aligner 210 to ensure they are aligned in the vertical plane.
    Presence sensor detects end of mussel passing so vertical aligner 210 can close as soon as practicable after the mussel has passed the Vertical Aligner
    Operated by a single cylinder ("Vertical Aligner").
    Secondary Ejector 211 activated during mussel clearing operations and as a check to ensure Vertical Aligner does not close on to mussels.

Figure 29:
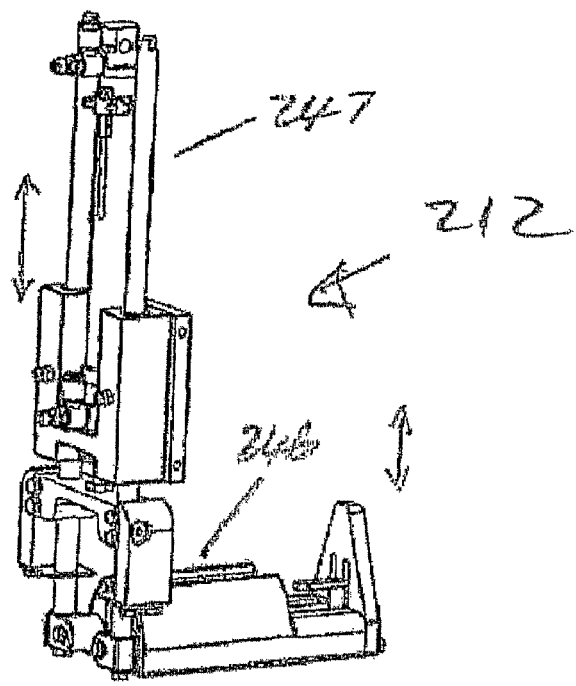

Lifting Assembly 212 as Shown FIG. 29

Lifting assembly or loader 212 is comparable to lifting assembly 13 as shown in FIG. 15 but with some changes whereby the loader 212 is combined in a supportive structure 245 to the vertical alignment device 210 and the opening head 213 (comparable to the knife assembly 15). As shown in FIG. 29 the loader 212 is formed as a cradle 246 as operatively part of a vertical slidable assembly 247 which allows the loader to move vertically to meet the holding and opening assembly. (the loader always operated on a vertical slide, it's just mounted at the in-feed end now rather than out the out-feed end)

Lifts mussel to the holding and opening assembly 213.
    Operated by single cylinder.
    Waits for vacuum cups to lower (or time out) before lowering.
    Presence sensor checks for empty loader and presence of new mussel.
    Reed switch on cylinder determines if OK to extend knife ("Loader Clear"). If transient signal from reed switch not detected, knife extends when the Loader Down sensor on.

Holding and Opening Assembly 213, Knife Assembly 214 and Out-Feed Chutes 215

Figure 30:
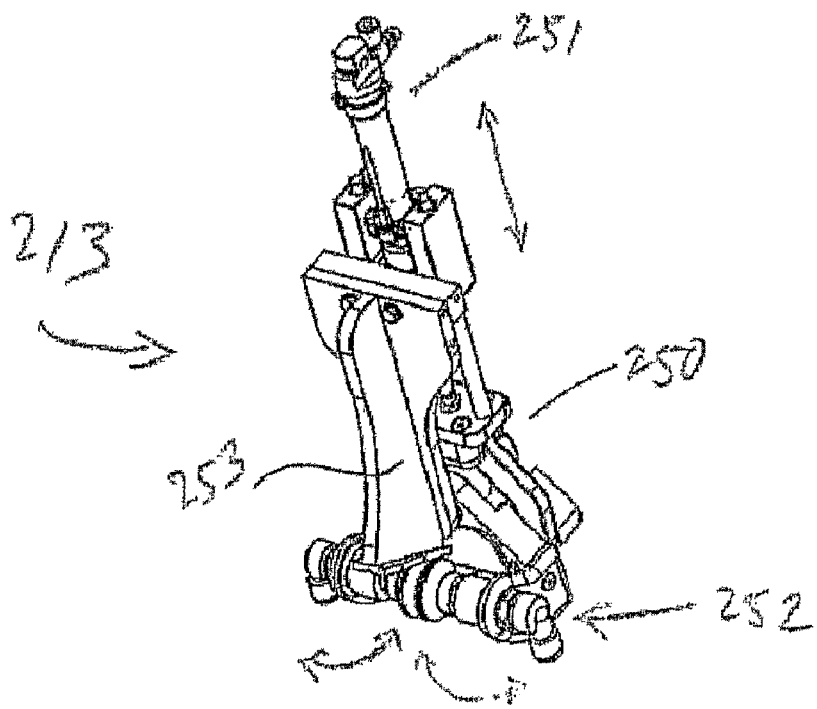
Figure 31:
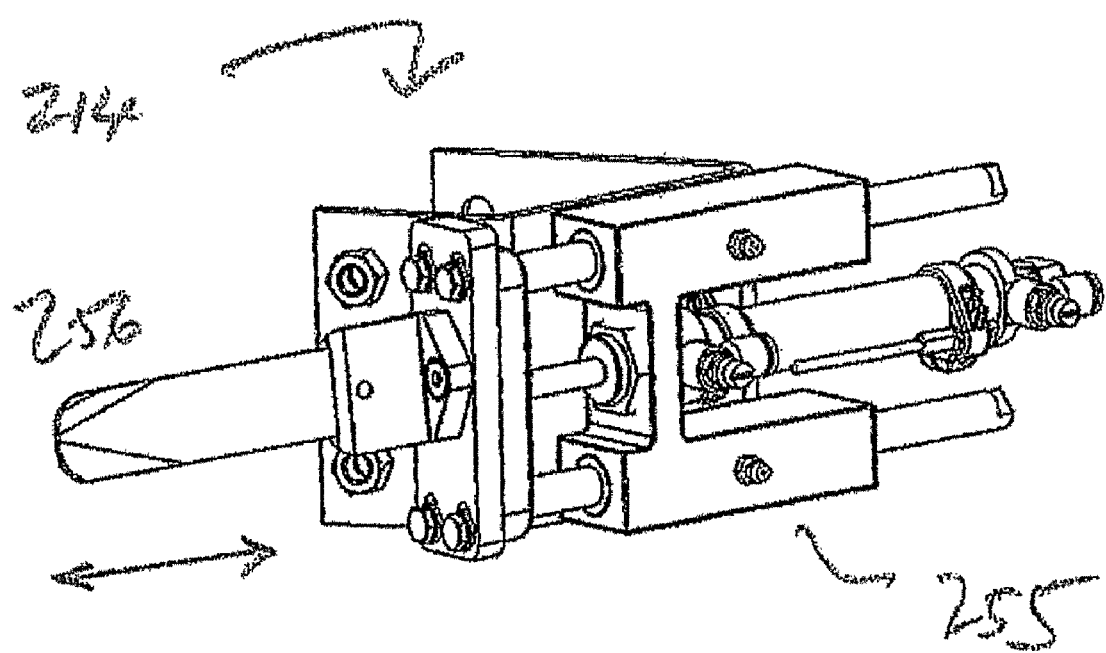

Holding and opening assembly 213 as shown in FIG. 30 is comparable to the holding and opening assembly 14 as shown in FIGS. 15-18 and 20a & b.

As shown cup assembly 252 comprises two mutually opposing cups which in use rotate in a direction at right angles to the axis of the support 251 to grab the mussel. Knife assembly 214 which is similar to knife assembly 15 of FIG. 21 is shown with some changes to affect better stability during its use. Knife assembly 214 comprises a support portion 255 and knife member 256.

Cup assembly 214 also has a hinge breaker 253 which is similar to the hinge breaker of FIGS. 20a & b. In operation the cutting and opening operates similarly to that described on-page 12 as for the FIGS. 1-21 which has a hinge breaker 88 as shown in FIG. 20b. Mussel is grabbed and is held against the hinge breaker, vacuum is applied to create a gape in the mussel allowing the knife 256 to be inserted therebetween to sever the meat from one shell half. Cups then move apart to break the hinge to allow separate retrieval of the shell halves.

Out-feeds chutes 215 (FIG. 32) comprise trough members having controllable flap 261 which function to provide automatic method of separating the empty shell half from the other shell half containing the meat As per the machine of FIGS. 1-21 as in FIGS. 20a &b as shown in FIG. 30 opening head 213 is angularly slidably supported in that there is a lower slidable cup assembly 250 slidably mounted on a support 251 with only a single vacuum sensor and vacuum valve on each head.
    The vacuum valve is pneumatically actuated and works in unison with a vacuum vent valve from a single valve slice
    Opening head operation is as follows:
        Vacuum cups close down on raised lifting assembly 212
            If the cups time out when closing, follow "no vacuum" sequence;
        Vacuum applied and checked;
        If no vacuum is present:
            Lower Lifting assembly 212 and wait until it is fully down
            Remove vacuum and retract vacuum cups
            Check Lifting assembly 212 is clear;
            N.B. There are no retries if vacuum is not detected
        If vacuum ok:
            Lifting assembly 212 lowered and checked for blockage
            Mussel is held between cups and against groove of hinge breaker 253
            Knife member 256 is extended once loader 212 is clear or loader 212 is down is detected;
            Vacuum cups retracted;
            Knife member 256 is retracted after a delay from the vacuum cups being retracted. N.B. A delay of zero means simultaneous retraction of the knife member 256 and vacuum cups.
            Vacuum checked
            Waste diverter flap 261 of out-feed chutes is activated if vacuum sensor on 215 This flap 261 is located at the bottom of the waste chute but it is not visible in any of the drawings except for FIG. 32 which shows the waste chute on its own the angled tray is simply a waste water collection tray. Shellfish ejected by 208 and 211 or which fall off the conveyor 206 or rollers 225 end up on the Re-feed conveyor 266 which is labelled in FIG. 22.
  Vacuum removed
    Waste diverter flap 261 is closed after a delay to allow waste shell to pass flap.
Other Systems
User Interface
  The machine has a User Interface 265 on each side for the operator to control the machine.
Recirculating Product Conveyor 266
  Product that falls off the rollers 225 or conveyor 206 (including ejected product) falls onto a moving floor as shown FIG. 22, in the machine and is transferred to an out-feed conveyor (not shown or included in this specification) running between all the machines/apparatus 1 or 200.
  The drive system can be an electric motor with no status checks (not VSD powered)
CIP System
  Fully automated for inside of machine
  One pneumatically operated supply valve
  Two moving CIP Carriages with spray balls mounted are driven by rodless cylinders
  Additional fixed spray nozzles are located on the Conveyor 206 and above the Out-feed Chutes and Scroll Feeders 222
  Vacuum lines are cleaned by activating a bypass valve which works in unison with the Common Vent valve.
Safety System
  A Safety System links the E-stop and door interlock circuits
Fault Detection and Monitoring System
  A PLC is responsible for detecting process faults in the normal operation of the machine. Specific faults that are detected include:
    Lack of product in the hopper or at the singulation rollers 225
      Hopper fault when no product is detected
      Roller Fault when no product detected by the Roller In-Feed Sensor for a given time.
    Lack of product in the machine 1 or 200
      Loader 212 has not been activated for a given time.
    Persistent lack of vacuum
      If vacuum could not be established for a certain number of consecutive mussels, raise vacuum error.
    Mussel not removed from loader 212
      Check for mussel presence when loader 212 is down before opening the vertical aligner.
    Actuation time-outs
      Primary Ejector retracted
      Reorientation Device down
      Secondary Ejector retracted
      Vertical Aligner 210 lowered
      Loader 212 lowered
      Knife 256 extension
      Other actuator jams
      Communication faults
        To interface PC
  A number of PLC outputs are used for internal diagnostic fault indicators. These indicators are positioned inside the machine close to individual sub-systems, allowing the operator to quickly identify the source of a fault. The following sub-systems have these fault indicators:
    1. In-feed 203
    2. Vision system 207-Camera
    3. Reorientation Device 209
    4. Opening Head 213
  In addition, each lane has external indicator lights to indicate the general operating state of the lane:
    Steady-state green: lane operating normally.
    Flashing green: non-critical fault, lane continues to operate.
    Flashing red: critical fault, including E-stop: lane has stopped operating.
    Steady-state red: Fault present and Stop pressed.
    Alternating red and green: Machine ready (in Stop state with no Faults)
  The response of the system to non-critical faults is to continue processing on both lanes, but to indicate a fault with a flashing green light and a warning message on the screen. An operator would check the machine and either clear the warning message or press the stop button and clear the fault if required.
  The response of the system to critical faults is to stop processing on the affected lane and indicate the fault state with a flashing red light and an error message on the User Interface. An operator will be expected to press the stop button to make a controlled stop of the unaffected lane then access the machine to take corrective action before clearing the error message and restarting the machine.
  The PC polls the PLC regularly to check for an error flag.
  Various other components as commonly used such as the housing covers and actual working of any actuating means have either only being partially shown or removed to allow viewing of the various assemblies or device or components but are assumed to be included to allow all the components etc to operate as planned.
  In general movement arrows have been shown in the figures which show some of the expected movement that each component or portion of an assembly can move either automatically or manually or to allow adjustment/movement or rotation in various axes or planes. The apparatus is designed to process as many mussels as possible which may or many not mean more than one mussel will be located at any one point in or on the apparatus during the complete process.
Advantages
  a) Minimal labour required for running.
  b) Operation is automatic.
  c) Both positioning and opening is carried out.
  d) Competitive manufacturing cost.
  e) Quick processing times.
  f) Safe and secure operation able to be easily viewed by PC and window guard.
  g) Apparatus is able to be correctly maintained to meet health and safety requirements.
  h) Controllable process using both manual and automatic electronic controlling means.
  i) In-feed and singulation to get mussels partially oriented and singulated.
  j) Vision system to determine orientation.
  k) 2-axis reorientation system.
  l) Feed system using chain conveyor.
  m) Referencing systems to ensure the mussel is in the correct position at the opening head.
  n) The vacuum cup system and hinge breaker used to hold and separate the mussel shells.
  o) Human-machine interface and electronic control system.
  p) Clean-in-place system.
  q) Process refinement to optimize the opening cycle time.
  r) Any number of processing lanes is possible.

Variations

Other frame, housing covers and guard shapes and viewing windows are equally possible. Any number of chutes or means for collecting the processed mussels and waste or rejected mussels are possible. All or part of the components of the apparatus can be fabricated out of any material such as stainless steel or any other materials that can be coated accordingly.

The invention may broadly be said to consist in the parts, elements and features referred to or indicated in the specification of the application individually or collectively in any and all combinations of any two or more of the parts, elements or features and where specific integers are mentioned herein which have known equivalents, such equivalents are deemed to be incorporated herein as if individually set forth.

Throughout the description of this specification, the word "comprise" and variations of that word such as "comprising" and "comprises", are not intended to exclude other additives, components, integers or steps.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

What we claim is:

1. A shellfish positioning and opening apparatus having at least one processing lane wherein the apparatus including the following stations of an in-feed and singulation station followed by a reorientation assembly station utilizing a vision system and a holding and opening assembly station wherein said stations are operatively connected in that order together to receive shellfish having meat therein to position said shellfish according to their shape and orientation to enable shellfish to be halved so that one shellfish half has the shellfish meat thereon, wherein the in-feed and singulation station includes a pair of parallel rollers to rotatably form a single row of semi upright or on-edge oriented shellfish.

2. The apparatus of claim 1 wherein the in-feed and singulation station includes a hopper operatively connected to a scroll feeding mechanism and then to a trough which feeds the shellfish to the pair of parallel rollers to rotatably form a single row of semi upright or on-edge oriented shellfish.

3. The apparatus of claim 2 wherein the apparatus includes a conveyor which operatively takes each shellfish from station to station.

4. The apparatus of claim 3 wherein the reorientation assembly is adapted to reorient the position of a singulated shellfish by movement in four different axes of direction wherein each shellfish is clamped, vertically lifted and held and then rotated wherein the reorientation assembly includes a support means and a vertically slidably clamping assembly which such clamping can also be rotated about a horizontal and vertical axis to reorient each shellfish such that keel and point are properly oriented.

5. The apparatus of claim 4 wherein a vertical alignment device is located procedurally after the reorientation assembly so the device is lowered to be in front of the shellfish to ensure they are aligned in the vertical plane.

6. The apparatus of claim 5 wherein a primary ejector being located between the vision system and the reorientation assembly can eject any shellfish from the conveyor which do not meet any predetermined position wherein the ejector comprises pneumatically operated piston controlled by a controller.

7. The apparatus of claim 6 wherein a secondary ejector being located between the reorientation assembly and the vertical alignment device also eject any shellfish wrongly positioned to allow any vertical alignment by the vertical alignment device wherein the ejector comprises pneumatically operated piston controlled by a controller.

8. The apparatus of claim 7 wherein various sensors are operatively located with respect to all station components such as scroll feeder sensor, two singulation sensors, presence sensor in before vertical alignment assembly and in lifting assembly(loader), single vacuum sensor, and reed switch on cylinder.

9. The apparatus of claim 8 wherein a lifting or loader assembly which is located after the re-orientation assembly includes a cradle slidably supported by a support which in use locates the shellfish in a general vertical plane which is vertically raised to allow the holding & opening assembly to operate.

10. The apparatus of claim 9 wherein the holding and opening assembly operatively includes a support means, slidable vacuum cup assembly and hinge breaker which is adapted to grab a shellfish from the loader to hold it against the hinge breaker, apply a vacuum to create a gape whereby a knife assembly slidably operates to cut the meat from one shellfish half and then the cups move apart to break the hinge.

11. A method of shellfish positioning and opening wherein a shellfish positioning and opening apparatus is provided having at least one processing lane wherein the apparatus including the following stations of an in-feed and singulation station followed by a reorientation assembly station utilizing a vision system and a holding and opening assembly station wherein said stations are operatively connected in that order together to receive shellfish having meat therein to position said shellfish according to their shape and orientation to enable shellfish to be halved so that one shellfish half has the shellfish meat thereon, the in-feed and singulation station includes a hopper operatively connected to a scroll feeding mechanism and then to a trough which feeds the shellfish to a pair of parallel rollers to rotatably form a single row of semi upright or on-edge oriented shellfish, a vertical alignment device is located procedurally after the reorientation assembly so the device is lowered to be in front of the shellfish to ensure they are aligned in the vertical plane, the holding and opening assembly operatively includes a slidable vacuum cup assembly and hinge breaker which is adapted to grab a shellfish from the loader to hold it against the hinge breaker, apply a vacuum to create a gape wherein a knife assembly slidably operates to cut the meat from one shellfish half and then the cups move apart to break the hinge, the method includes the following steps of processing at least one shellfish as located on a conveyor between said stations:

singulating the shellfish by adjusting the feeding therein leading to the rotating rollers;

applying vision system to determine and compare orientation of shellfish;

reorienting each shellfish so that the shellfish is pointing in the right direction;

abutting said shellfish to the vertical alignment device to cause said shellfish to be substantially vertical and;

loading shellfish onto lifting assembly to lift said shellfish to allow the holding and opening assembly to hold it against the hinge breaker, apply a vacuum to create a gape wherein the knife assembly slidably operates to cut the meat from one shellfish half and then the cups move apart to break the hinge.

* * * * *